(12) United States Patent
Radermacher

(10) Patent No.: US 8,686,660 B2
(45) Date of Patent: Apr. 1, 2014

(54) OLED WITH INTEGRATED DELAY STRUCTURE

(75) Inventor: Harald J. G. Radermacher, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 270 days.

(21) Appl. No.: 13/132,334

(22) PCT Filed: Nov. 30, 2009

(86) PCT No.: PCT/IB2009/055398
§ 371 (c)(1),
(2), (4) Date: Jun. 2, 2011

(87) PCT Pub. No.: WO2010/064184
PCT Pub. Date: Jun. 10, 2010

(65) Prior Publication Data
US 2011/0234097 A1 Sep. 29, 2011

(30) Foreign Application Priority Data

Dec. 5, 2008 (EP) ..................................... 08170795

(51) Int. Cl.
*H05B 41/16* (2006.01)
*H01J 7/44* (2006.01)
*G09G 3/14* (2006.01)

(52) U.S. Cl.
USPC ................. 315/246; 315/50; 315/51; 315/53; 345/46; 345/44; 345/82

(58) Field of Classification Search
USPC ............... 345/82–84, 55, 91, 48, 76, 77, 204, 345/214; 315/164, 167, 169.1, 169.3, 169.4
See application file for complete search history.

(56) References Cited

U.S. PATENT DOCUMENTS 5,519,414 A * 5/1996 Gold et al. ..................... 345/208
7,019,721 B2 * 3/2006 Thielemans et al. ............ 345/82

FOREIGN PATENT DOCUMENTS

| EP | 0154662 A1 | 9/1985 |
| EP | 1169695 | 1/2002 |
| WO | 9615519 A1 | 5/1996 |

\* cited by examiner

*Primary Examiner* — Vibol Tan
(74) *Attorney, Agent, or Firm* — Mark L. Beloborodov

(57) ABSTRACT

An organic light-emitting diode (35) is described, which comprises a light-emitting structure designed to emit light when it is powered, and a delay structure designed to delay a propagation of at least two power signal pulses ($4a$_left, $4b$_right, $4a$_top, $4b$_bottom) having a temporal relationship with one another and such a signal strength that a part of the light-emitting structure is driven in dependence on coincidence of the power signal pulses at said part of the light-emitting structure, and a terminal structure designed to receive the at least two power signal pulses ($4a$_left, $4b$_right, $4a$_top, $4b$_bottom) and to feed the delay structure at its different positions with the at least two power signal pulses ($4a$_left, $4b$_right, $4a$_top, $4b$_bottom). A circuit for powering said light-emitting structure, as well as a method of operating said organic light-emitting diode (35) is also described.

18 Claims, 12 Drawing Sheets

OLED WITH INTEGRATED DELAY STRUCTURE

FIELD OF THE INVENTION

The invention relates to an organic light-emitting diode comprising a light-emitting structure which is designed to emit light when it is powered. The invention further relates to a circuit for powering the organic light-emitting diode and a method of operating an organic light-emitting diode, wherein the light-emitting diode comprises a light-emitting structure which is designed to emit light when it is powered

BACKGROUND OF THE INVENTION

FIG. 7 is a schematic cross-sectional view of a basic structure of an organic light-emitting diode (OLED) 28 as comprised in the art. The OLED 28 comprises a substrate 29 through which light can be emitted during operation, as indicated by an arrow 30. The inside of the OLED 28 is encapsulated by a so-termed hermetic cover 31. The OLED 28 further comprises a cathode connector 32 which extends inside the cover 31 adjacent to the cover 31, wherein the extension into the inside (planar structure) of the OLED 28 will hereinafter be termed cathode layer 32a. The OLED 28 further comprises an anode connector 33 which extends inside the cover 31 adjacent to the substrate 29. The structure of the OLED 28 also comprises a stack of organic layers 34 (including, for example, organic layers for light generation, charge generation layers, buffer layers, etc. but not limited to these types of layers), the present version of which shows three layers. This stack of layers 34 is responsible for generating the light to be emitted when powered by an electric signal of suitable polarity and strength, e.g. a direct current (DC) signal applied between the anode connector 33 and the cathode connector 32. The anode connector 33 and the cathode connector 32 realize a terminal structure of the OLED 28. A reference potential is typically provided via the cathode connector 32. The extension of the anode connector 33 into the inside (planar structure) of the OLED 28, hereinafter termed anode layer 33a, adjacent to the substrate 29 is also termed top electrode and may be made of a transparent conduction material, e.g. ITO (Indium Tin Oxide) which is known to have a sheet resistance. Because of the large two-dimensional planar structure or area (e.g. 0.15 m·0.15 m) of the OLED 28 and its sandwich-like design, it already intrinsically comprises a capacitor having a relatively high capacitive value per unit of area or length.

One of the problems of such prior-art OLEDs 28 is related to the sheet resistance created by the anode layer 33a (also termed top electrode). The sheet resistance is responsible for brightness non-homogeneity problems known in the art. Typically, such an OLED 28 shows a gradient in its brightness distribution. The brightness of the emitted light typically drops from the corner or edge region towards the center region of the planar light-emitting surface of the OLED 28.

OBJECT AND SUMMARY OF THE INVENTION

It is therefore an object of the invention to provide an OLED of the type described in the opening paragraph, having an improved design and performance. It is also desirable to provide a circuit and a method of the type described in the second paragraph, allowing operation of an OLED in such a way that the problems identified above are overcome.

This object is achieved by an organic light-emitting diode comprising a light-emitting structure designed to emit light when it is powered, and a delay structure designed to delay a propagation of at least two power signal pulses having a temporal relationship with one another and such a signal strength that a part of the light-emitting structure is driven in dependence on coincidence of the power signal pulses at said part of the light-emitting structure, and a terminal structure designed to receive the at least two power signal pulses and to feed the delay structure at its different positions with the at least two power signal pulses.

This object is also achieved by a circuit for selectively powering a part of a light-emitting structure of an organic light-emitting diode designed to emit light when it is powered, said light-emitting diode comprising a terminal structure designed to receive the at least two power signal pulses and to feed a delay structure of the organic light-emitting diode at different positions of the delay structure with the at least two power signal pulses, wherein the delay structure is designed to delay a propagation of the at least two power signal pulses, said circuit comprising a connector structure designed to cooperate with the terminal structure of the organic light-emitting diode and to transfer the at least two power signal pulses from the circuit to the organic light-emitting diode, and a generator arrangement connected with the connector structure, wherein the generator arrangement is designed to generate the at least two power signal pulses in such a way that the at least two power signal pulses have a temporal relationship with one another and such a signal strength that said part of the light-emitting structure is driven in dependence on coincidence of the power signal pulses at said part of the light-emitting structure.

This object is also achieved by a method of operating an organic light-emitting diode comprising a light-emitting structure designed to emit light when it is powered, the method comprising the steps of:

receiving at least two power signal pulses, wherein the at least two power signal pulses have a temporal relationship with one another and such a signal strength that a part of the light-emitting structure is driven in dependence on coincidence of the power signal pulses at said part of the light-emitting structure; feeding a delay structure of the organic light-emitting diode at different positions of the delay structure with the at least two power signal pulses; delaying a propagation of the at least two power signal pulses by means of the delay structure; and driving said part of the light-emitting structure in dependence on coincidence of the power signal pulses at said part of the light-emitting structure.

It is advantageously achieved by these measures that a brightness distribution within the light-emitting surface of an OLED can be created and/or tuned in such a way that, on the one hand, a compensation of the known brightness non-homogeneity problems during DC operation is achieved. On the other hand, however, the features according to the invention also allow creating impressive visual effects without additional means to be provided.

The OLED and the method according to the invention are based on the recognition that power to be supplied to a selected part of the light-emitting structure is addressed by coincidence of at least two power signal pulses, wherein the total power or voltage or, in more general terms, the total signal strength which is releasable to the individual part of the light-emitting structure depends on the fact whether only one of the propagating power signal pulses or a superposition of at least two power signal pulses is present at the position of said part of the light-emitting structure. In other words, the light-emitting structure is powered in dependence on coincidence of the power signal pulses at a certain part of the light-emitting structure of the OLED. This may lead to areas being activated or deactivated to radiate light. Also areas of increased or decreased luminance may be created. The temporal relationship determines the location of coincidence of the two power signal pulses within the delay structure. The temporal relationship may be given in the timing of generating the different power signal pulses having an identical shape at various, different moments. Changing the temporal relationship will lead to different resultant superpositioning effects. Alternatively, setting the frequency of generating the individual power signal pulses at different values may create a particular temporal relationship as well. However, generating power signal pulses having a different shape and/or duration may also lead to a temporal relationship. All of these numerous ways of creating the temporal relationship may be combined, as the case may be, and the person skilled in the art will apply the desired solution for generating the temporal relationship without departing from the scope of the present invention.

In order to address power to a selected part of the light-emitting structure by means of propagating power signal pulses, the power signal pulses need to be received by the OLED. A conventional OLED which shows an anode connector and a cathode connector, which jointly create the terminal structure of the OLED and are both located at opposite sides of the OLED, is basically designed to be powered by means of a DC power signal to be applied between the anode connector and the cathode connector, one of which provides the reference signal. Unlike this conventional connector structure, the terminal structure according to the OLED of the invention allows receiving the power signal pulses electrically independently of each other. Still, the terminal structure comprises one terminal for providing the reference potential, but other terminals are arranged to receive the power signal pulses and to inject or feed each individual power signal pulse into the delay structure at different positions of this structure. This allows a spatial propagation of the power signal pulses within the delay structure in an individually independent fashion until they coincide at a particular position within the delay structure and interact constructively or destructively. In order to allow the constructive or destructive superposition of the propagating power signal pulses, these power signal pulses require a common reference potential which is typically provided via one of the electrodes of the OLED.

The OLED typically comprises an anode layer and a cathode layer. One of the layers can be used to provide said common reference potential. It is also possible to omit the use of a common reference potential inside the OLED. Instead of having a number of connectors for the power signal pulses for both dimensions on one electrode layer, independent electrode layers are used for the two dimensions. For example, in a plane-like structure, the anode layer may have a left connector and a right connector and the cathode layer may have connectors, which are termed top connector and bottom connector, in the orthogonal direction in comparison with the left and right connectors. Each of these layers may be used for independent power signal pulse propagation, e.g. from said left connector to said right connector and from said top connector to said bottom connector. In this case, the common reference potential may be provided outside the OLED, e.g. by means of a generator arrangement or a general circuit connected to the OLED.

On the one hand, the solution according to the invention may be used for achieving an overlap of the power signal pulses having a first—e.g. positive—polarity, which allows the supply of power to a part of the light-emitting structure to be based solely on the power conveyed by the power signal pulses. However, also an overlap of the coinciding power signal pulses with a DC signal may achieve the same result. On the other hand, an overlap of the power signals having a second—e.g. negative—polarity may be achieved, which can be used to inhibit the supply of power to a part of the light-emitting structure, while at the same time other parts of the light-emitting structure that are not exposed to the superposition of said power signal pulses having the second polarity are still powered by e.g. a DC supply or other power signal pulses having the first polarity. Hence, the power signal pulses may be used for activating (powering) as well as deactivating (avoiding/inhibiting the supply of power or the ability to receive power) of a part of the light-emitting structure. As a result, the part of the light-emitting structure may be driven in dependence on the coincidence of the power signal pulses.

A circuit according to the invention generates the power signal pulses and transfers them to the OLED according to the invention. In order to facilitate transfer of the power signal pulses, the circuit comprises a particular connector structure which is designed to cooperate with the terminal structure of the OLED. This connector structure allows contacting of the corresponding terminal structure of the OLED in such a way that the individual power signal pulses can pass over from the circuit into the OLED at different positions at which the terminal structure of the OLED is located. A possible design of such a connector structure may show a common reference signal connector and a plurality of further connectors, each of which is dedicated to a particular power signal pulse for transferring the particular power signal pulse with reference to the reference signal into the OLED where delayed propagation and, depending on the timing of the power signal pulses, also constructive or destructive superposition may take place at parts of the light-emitting structure. For example, in contrast to a prior-art OLED, the further connectors may be a plurality of cathode connectors located at different positions of the terminal structure of the OLED, e.g. on the four edges of the rectangular plane extension of the OLED, while the anode connector is located at its known position and serves to receive the common reference signal. The connector structure takes account of this with connectors located at corresponding positions.

The circuit may further also comprise one generator cooperating with a switch or multiplexer for selecting/addressing the transfer of power signal pulses towards said further connectors. These elements or simply a plurality of individual generators may realize a generator arrangement designed to generate the at least two power signal pulses. The generator arrangement is connected with the connector structure so that generated power signal pulses can be transferred into the OLED via the connector structure. The design of the generator arrangement further allows setting the signal strength of the at least two power signal pulses so that a part of the light-emitting structure of the OLED is driven in dependence on coincidence of the power signal pulse at said part of the light-emitting structure. Finally, in order to allow coincidence of the power signal pulse to take place at a particular—or in other words, selected or addressed—part of the light-emitting structure, the design of the generator arrangement, which may further comprise timing control means, allows creating the temporal relationship, or in other words, a timing of the at least two power signal pulses. Tuning or setting the timing in dependence on the particular properties of the delay structure of the OLED allows control of that part of the light-emitting structure that will be exposed to constructively or destructively interfering power signal pulses.

The dependent claims and the subsequent description disclose particularly advantageous embodiments and features of the invention, while in particular the method according to the invention may be further developed as defined in the dependent OLED or circuit claims.

According to one aspect of the invention, the delay structure comprises a layer having inductive properties, preferably a ferromagnetic layer, which extends adjacent to the light-emitting structure. This layer may be located on either side of the electrodes. However, it is particularly advantageous if it is located on the side of the non-transparent electrode that is directed towards a hermetic cover of the OLED. This allows maintaining the basic design of the OLED and requires only minor design modifications outside the core light-emitting structure.

According to a further aspect of the invention, the layer having inductive properties, e.g. a ferromagnetic layer, extends adjacent to an electrode layer and/or at least partly overlaps or partly covers at least one or a plurality of (e.g. two or more) electrode connectors of said electrode layer. This allows injection of the individual power signal pulses into the delay structure in a relatively simple way by utilizing connectors of a standard shape and dimensions, at least a plurality of which may be located at standard positions, if at all. The layer may be in direct contact with the electrode layers or the electrode connectors but it may also be located at a certain distance from these elements.

In one embodiment of the invention, the layer having inductive properties, e.g. a ferromagnetic layer, may extend adjacent to the electrode layer. Also the electrode layer may be transparent. This allows utilizing also the transparent electrode of the OLED in the direction of the light emission for creating the delay structure.

According to a further aspect of the invention, the delay structure comprises electrodes and/or electrode connectors of the organic light-emitting diode. This allows realizing the delay structure either partly or completely by means of the electrodes and/or the electrode connectors, provided that these elements allow setting an appropriate inductive value per unit length or area or per element, as the case may be, dependent on the selected implementation of the inductive component of the delay structure. A proper selection of materials for the electrodes and/or the electrode connectors supports this design choice.

According to one embodiment of the invention, the delay structure comprises at least one of the electrode layers of the organic light-emitting diode and is structured in electrode layer segments and inductive elements, e.g. coils, wherein neighboring electrode segments are connected with each other by means of said inductive elements. This allows a simple creation of an inductive element in the delay structure because such a coil or coils can be added to the design of the OLED in a relatively cost-efficient manner as a printed coil or coils by applying a well-controlled, reproducible and cost-efficient method. This solution further allows serration of structured electrode layers. This allows treating the light-emitting surface of the OLED as if it were a segmented structure.

In particular in combination with electrode segments designed to form pixel segments and/or predefined free-form segments, impressive visual effects can be achieved by applying the concept of propagating power signal pulses only.

According to a further aspect of the invention, the delay structure comprises a capacitive element which is realized by means of the light-emitting structure of the OLED. The capacitive element is realized by means of electrode connectors, electrode layers and a light-emitting structure, e.g. comprising a stack of organic layers, in between the electrode layers. In this context, electrode layers form capacitor plates and the light-emitting structure realizes a dielectric medium between these capacitor plates. This allows utilizing the intrinsic properties of the light-emitting structure without any further circuitry components to be added in order to realize a part of, or even the complete delay structure. It further allows setting the value of the capacitive element by selecting a particular design of the light-emitting structure.

The delay structure in an OLED according to the invention may be one-dimensional. This would require feeding of the power signal pulses from opposite sides, e.g. parallel sides of a rectangularly shaped delay structure, into the delay structure, provided that the entire side or a substantial part of the side of the delay structure is exposed to the individual power signal pulse substantially at the same time. Hence, a plane wave-like propagation of the power signal pulses in only one direction may be achieved. In terms of designing the terminal structure, it is required to provide such a design that feeding the respective power signal pulses along the entire respective side of the delay structure is possible. Such a design may be achieved by extending the respective electrode connector along said side of the delay structure. In a preferred embodiment, the electrode connectors extend along the entire respective side of the delay structure. Alternatively, designs in which the length of the extension of the electrode connectors deviates from the exact length of the respective side of the delay structure are also feasible. However, it has proved to be particularly advantageous if the delay structure comprises an inductive element and a capacitive element, both jointly forming a delay plane for delaying the propagation of the power signal pulses in both dimensions of the delay plane. This allows propagation of the power signal pulses in a two-dimensional plane in a simple manner. Hence, the full range of possible visual effects is achievable. Again, a design of the terminal structure would require the individual power signal pulses to be fed into the delay structure at opposite sides of the delay plane, e.g. left-right side and top-bottom side, provided that the entire side or a substantial part of the side of the delay structure is exposed to the individual power signal pulse substantially at the same time. Again, a plane wave-like propagation of the power signal pulses in only one direction (e.g. left-right direction or top-bottom direction), but now in two dimensions may be achieved at the same time. Although the rectangular shape of the delay plane is preferred, other shapes may also be used in accordance with individual demands and design requirements.

According to a further aspect of the invention, the light-emitting structure comprises a stack of layers which may be realized by organic and/or inorganic layers jointly having a non-linear voltage-versus-current characteristic curve. This allows defining the strength of the plurality of power signal pulses in such a way that a well-defined number of power signal pulses is needed before the area of the OLED can be powered, because only the desired/designed number of power signal pulses will achieve a signal strength that is beyond the threshold voltage of the OLED when the appropriate number of power signal pulses coincides at a specific area of the light-emitting structure. However, also the reverse effect may be achieved by selectively allowing power signal pulses to interfere destructively at certain parts of the light-emitting structure of the OLED. This may lead to a number, e.g. a selected area of the OLED to be inhibited from radiating light or to show a reduced luminosity in contrast to other light-emitting areas of the OLED.

According to a further aspect of the invention, a light-emitting structure of a uniform type may be the preferred choice. However, according to another aspect of the invention, a light-emitting structure split into segments may also be provided in accordance with individual applications. This allows easy pixel or free-form like light emission when the individual segments are appropriately addressed with power signal pulses, which optionally superimpose a DC bias voltage.

In a preferred embodiment of the invention, the terminal structure for receiving the at least two power signal pulses comprises at least two electrode connectors, e.g. preferably but not necessarily of the same type of electrode such as two cathode connectors of the cathode layer. In this configuration, a number of two or more anode connectors or a number of two or more cathode connectors may be selected and located e.g. at different sides of a rectangularly shaped OLED in order to allow feeding of the power signal pulses in relation to a common ground signal electrode. This allows feeding the power signal pulses from different sides of the OLED into the delay structure. Feeding may take place from two sides only. It is particularly advantageous when the power signal pulses are fed from all four sides if the OLED is rectangularly shaped. However, without departing from the gist of the invention, other feeding geometries depending on the particular design of the form of the OLED may be considered, and various locations and pluralities of feeding points/electrode connectors may be selected. The electrode connectors do not necessarily have to be located on the outer edges of the OLED but may also be located within the electrode layers, e.g. the non-transparent electrode layer. In this situation, the electrode connectors may extend perpendicularly to the light-emitting structure and are connectable, e.g. from the top of the OLED, or may be connected via other means (wire, additional electrode layer) to the outer edges.

In advanced applications of the OLED according to the invention, not only the OLED alone but also a device or a circuit comprising such an OLED is advantageous because it allows autonomous operation. In particular, in addition to the generator arrangement and its connector structure, the circuit according to this embodiment also comprises the new OLED which is connected—in a permanent or releasable manner—with the connector structure of the circuit.

The above-mentioned advantages and effects achieved also apply to the method according to the invention.

Other objects and features of the present invention will become apparent from the following detailed description with reference to the accompanying drawings. It is to be understood, however, that the drawings are designed solely for the purposes of illustration and should not be considered as a definition of the limits of the invention.

BRIEF DESCRIPTION OF THE DRAWINGS

FIG. 4b shows one of the matrix elements of FIG. 4a;

FIG. 5 shows a circuitry realization of the concept of the two-dimensional configuration shown in FIG. 4a;

FIG. 12b shows a detail of a power signal generator shown in FIG. 12a;

FIG. 13a shows a propagation of power signal pulses in the circuit of FIG. 12a;

FIG. 13b shows a simulation result for the circuit shown in FIG. 12a; and

Figure 1:
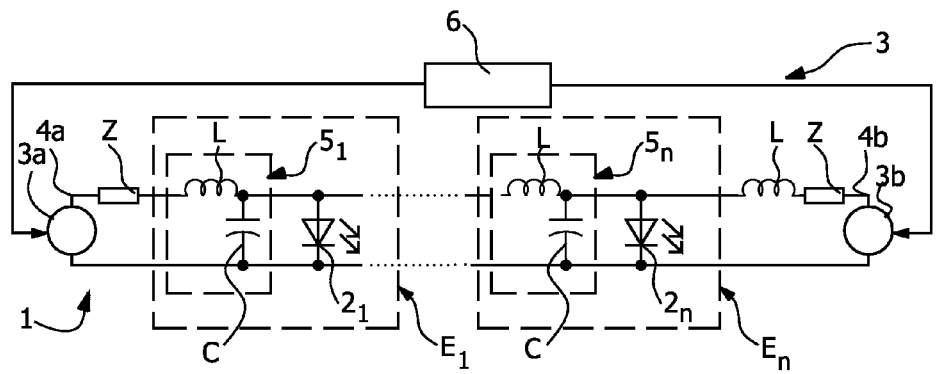
FIG. 1 is a schematic circuit explaining a principle of operation according to the invention in a one-dimensional configuration.

In the drawings, identical signs and numerals refer to identical objects and items throughout. Objects and items in the diagrams are not necessarily drawn to scale.

DESCRIPTION OF EMBODIMENTS

The present invention relates to an innovative improvement in the field of organic light-emitting diodes (OLED). Before dealing with the particular design of such an innovative OLED, the underlying principle of operation of the design of the OLED according to the invention will be elucidated hereinafter. For the sake of clarity and completeness, it is to be noted that the principle of operation will be explained with reference to discrete circuits.

Figure 7:
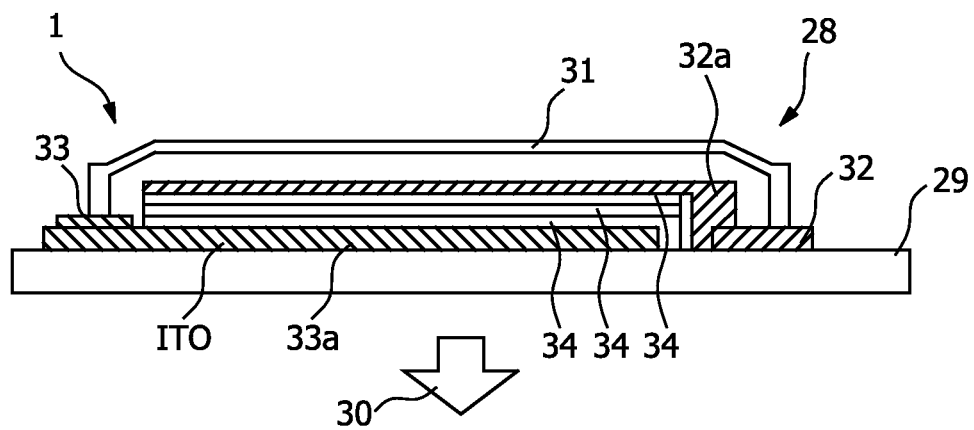
FIG. 7 is a schematic view of a structure of a state-of-the-art organic light-emitting diode (OLED)

FIG. 1 shows a circuit 1 for selectively powering a plurality of load elements $2_1$ to $2_n$, which in the present case are realized by individual ideal OLEDs. The ideal OLEDs in this example are considered to have only light-emitting properties, which is in contrast to the realistic electrical properties such as capacitive or inductive properties of realistic embodiments of OLEDs, as will be explained in further detail below with reference to FIG. 7. However, similarly to LEDs, these ideal OLEDs have a non-linear voltage-versus-current characteristic curve, which allows current flow and consequent emission of light only if a threshold voltage VF—also termed forward voltage—in the forward direction is applied between the anode and cathode connectors of the OLED. Depending on the color of the emitted light for which an OLED and/or the layer configuration is designed, a certain forward voltage must be applied, e.g. in the range of approximately 2 to 8 Volts.

The circuit 1 further comprises a plurality of delay elements $5_1$ to $5_n$, which are interconnected so as to form a propagation line for power signal pulses 4a and 4b, each delay element $5_1$ to $5_n$ being designed to delay the propagation of the power signal pulse 4a or 4b and to release the power signal pulse 4a or 4b towards the respective OLED $2_1$ to $2_n$. For the purpose of explanation, only said respective OLED $2_1$ to $2_n$ is connected between and in parallel with two neighboring delay elements $5_1$ to $5_n$ such as, for example, between the delay elements $5_1$ and $5_n$, wherein the latter is not shown in FIG. 1 but immediately succeeds OLED $2_1$. Each delay element $5_1$ to $5_n$ is realized by a resonant circuit comprising an inductor L and a capacitor C. Together with the first OLED $2_1$, the inductor L and the capacitor C of the first delay element $5_1$ form a so-termed unit element indicated by a box $E_1$. This unit element $E_1$ is followed by other unit elements $E_2$ to $E_n$, of which unit elements $E_2$ to $E_{n-1}$ are not indicated in FIG. 1. For the sake of clarity and simplicity, such boxes $E_1$ to $E_n$ indicating unit elements such as the one termed $E_1$ are used in the following Figures, where appropriate. Given the symmetry of the delay line, the delay elements $5_1$ to $5_n$ are shown as viewed from the first power signal pulse 4a when traveling from left to right in the plane of the drawing. In this situation, the propagation line seems to end with a supplementary inductor L at its right end, not belonging to any of the delay elements $5_1$ to $5_n$. However, this is a question of the direction of viewing along the propagation line, which will be explained hereinafter. Let it be assumed that the second power signal pulse 4b travels from right to left in the plane of the drawing. This second power signal pulse 4b will then also face a sequence of delay elements $5_1$ to $5_n$. In this case, the sequence of delay elements $5_1$ to $5_n$ will start with the first inductor L viewed from the right side and comprises the first capacitor C viewed from the right side. Also in this scenario, a supplementary inductor L may now remain at the left end of the propagation line. Consequently, independent of which side—left or right—the power signal pulse 4a or 4b enters the propagation line, this line appears to have the same structure for each power signal pulse 4a or 4b, which is necessary in order to provide symmetric propagation conditions.

Ignoring the dissipative effect of the OLEDs when operated in the conductive state, the repeated structure of inductors L and capacitors C realizes a lossless transmission line having a characteristic impedance Z:

$$Z = \sqrt{\frac{L}{C}} \qquad \text{(Equation 1)}$$

The delay per segment is given as:

$$t_{seg} = \sqrt{L \cdot C} \qquad \text{(Equation 2)}$$

Utilizing the characteristics of the transmission line, the gist of the invention is based on the recognition that each propagating power signal pulse 4a and 4b shall have a signal strength measured in voltage that does not exceed the forward voltage of the OLEDs $2_1$ to $2_n$. Only the superposition of the two (2) power signal pulses 4a and 4b shall exceed the forward voltage of the OLEDs $2_1$ to $2_n$. Consequently, the shape of the individual pulses 4a and 4b can be selected to be such that its maximum value does not trigger a current flow in the forward direction when passing along the position of one of the OLEDs $2_1$ to $2_n$ in the string. Given the non-linear characteristic curve of an OLED, a (nearly) lossless propagation of signal pulses 4a and 4b along the structure of the delay elements $5_1$ to $5_n$ is achieved as long as the OLEDs remain in the non-conductive state, or, in other words, in the switched-off state. In the present case, a rectangular power signal pulse shape was chosen without limiting the invention to only this type of shape. In the present example, the power signal pulses 4a and 4b show a signal strength of 0.75 times the forward voltage VF, which would lead to a voltage of 1.5 times the forward voltage VF in the case of coinciding (super-positioned) power signal pulses 3a and 3b if no OLEDs were present. However, given the fact that OLEDs are present and considering the non-linear voltage-versus-current characteristics of the OLEDs $2_1$ to $2_n$, the actual value of the voltage V achieved by the coinciding power signal pulses 4a and 4b will be finally determined by characteristics of both the OLEDs and the delay structure.

For the purpose of generating the power signal pulses 4a and 4b, the circuit comprises a generator arrangement 3. This generator arrangement 3 comprises a first generator 3a which is connected with the first delay element $5_1$ of the propagation line. The first generator 3a is designed to generate the first power signal pulse 4a and to feed it into the string of delay elements $5_1$ to $5_n$ at the position of the first element 5a. The generator arrangement 3 further comprises a second generator 3b which is connected with the last delay element $5_n$ in the propagation line. The second generator 3b is designed to generate the second power signal pulse 4b and to feed it into the string of delay elements $5_1$ to $5_n$ at the position of the last element $5_n$.

Each generator 3a and 3b comprises an impedance (not shown in detail) which is equal to the impedance Z according to Equation 1 in order to provide a condition of matched power transmission, which prevents reflections at either side of the transmission line.

The generator arrangement further comprises a control unit 6 which is connected with the first generator 3a and the second generator 3b and is designed to control a temporal relationship between the two power signal pulses 4a and 4b. In fact, the cooperation between the control unit 6 and the two power signal generators 3a and 3b allows triggering of the moment of generating the individual power signal pulses 4a and 4b, such that the power signal pulses 4a and 4b, when propagating through the string of delay elements $5_1$ to $5_n$ and OLEDs $2_1$ to $2_n$, coincide at the desired OLED. The control unit 6 may operate autonomously or may receive data or other forms of signals which allow the control unit 6 to control the generation of the power signal pulses 4a and 4b. If it is not possible or not desirable to connect both generators 3a and 3b to the control unit 6, two separate (individual) control units may be used. In this context and solely as one of a plurality of possible implementations, one control unit may generate control signals with a given frequency. The other control unit may synchronize to these control signals of the first control unit and set the amplitude and delay for the power signal pulses to be generated in dependence on its own or received control signals in order to achieve a desired or commanded light result, including the avoidance of generating power signal pulses 4a and 4b when no light is needed or desired.

Figure 2A:
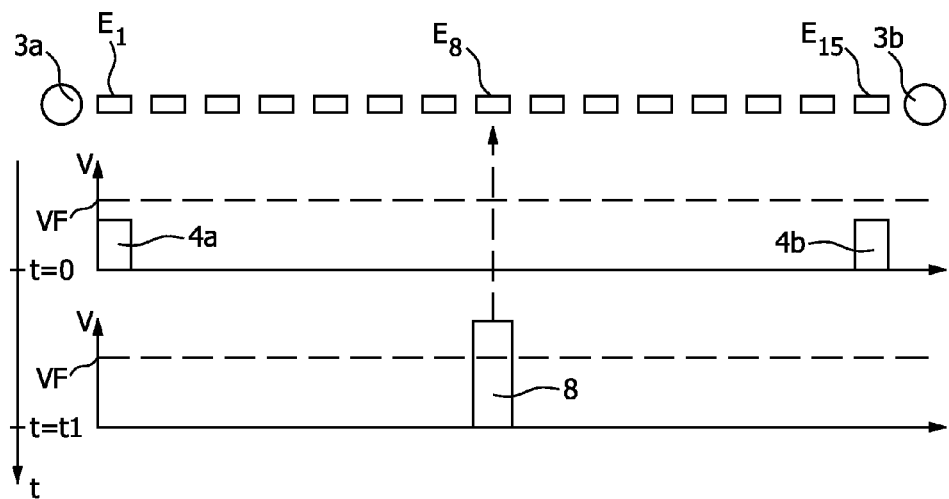
FIG. 2a shows schematically, in the form of a sequence of signal diagrams, a first operation scenario of the circuit shown in FIG. 1.
Figure 2B:
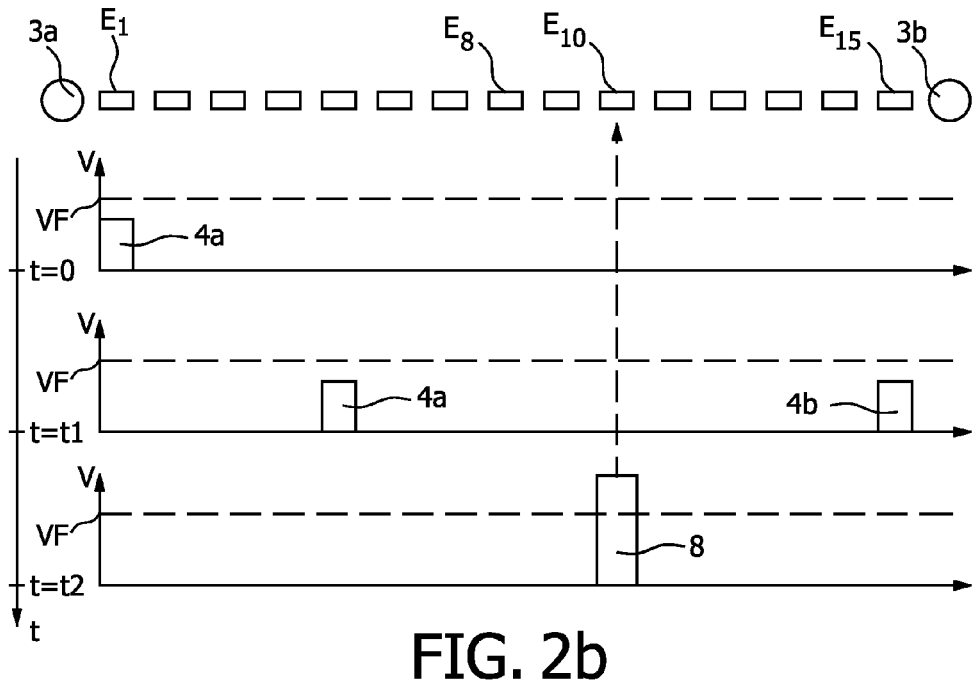
FIG. 2b shows, in analogy with FIG. 2a, a second operation scenario of the circuit shown in FIG. 1.
Figure 2C:
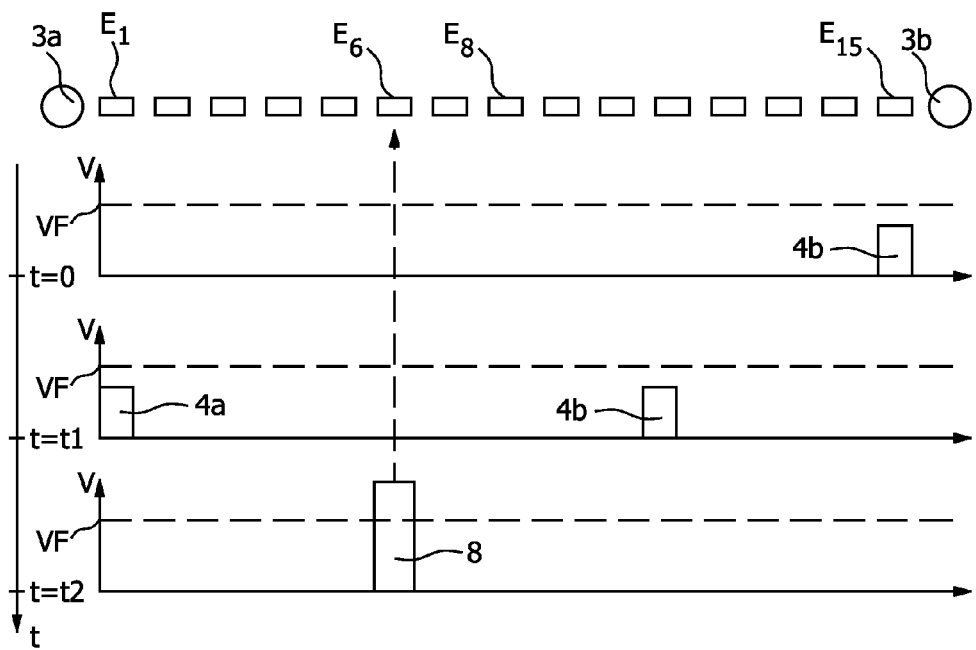
FIG. 2c shows, in analogy with FIGS. 2a to 2b, a third operation scenario of the circuit shown in FIG. 1.

The principle of operation is shown in a conceptual manner in FIG. 2a, in which the signal diagrams in this Figure visualize a first operation scenario, FIG. 2b visualizes a second operation scenario, and FIG. 2c visualizes a third operation scenario in accordance with a method according to the invention in the case of a one-dimensional configuration in more detail. For each operation scenario, a temporal relationship between the individual signal diagrams of each FIGS. 2a to 2c is shown by means of the timeline t on the left side of FIGS. 2a to 2c. In this particular example, there are fifteen (15) delay elements and OLEDs, which is shown in the form of rectangular boxes $E_1$ to $E_{15}$. As described hereinbefore with reference to FIG. 1, there is an additional inductor at one side of the delay structure, which, for the sake of simplicity, is ignored in all Figures showing the timing of power signal pulses. Each box $E_1$ to $E_{15}$ comprises one delay element; e.g. $E_1$ comprises delay element $5_1$ and the corresponding OLED $2_1$, while $E_2$ comprises delay element $5_2$ and the corresponding OLED $2_2$. The boxes $E_1$ to $E_{15}$ are drawn along the x-axis of the diagrams, which indicates the spatial position of the individual boxes $E_1$ to $E_{15}$ in arbitrary units. On either side, the delay structure is terminated by the respective generator 3a or 3b. Given the fact that the first power signal pulse 4a is fed into the first box $E_1$ indicated on the left side of the string of boxes $E_1$ to $E_{15}$ and the second power signal pulse 4b is fed into the fifteenth box $E_{15}$ indicated on the right side of the string of boxes $E_1$ to $E_{15}$, the delay time dt can be defined in terms of $t_{right}$ (starting time of the second power signal pulse 4b) and $t_{left}$ (starting time of the first power signal pulse 4a) as follows:

$$dt = t_{right} - t_{left} \quad \text{(Equation 3)}$$

The y-axis of the diagram reflects the voltage of the power signal pulses 4a and 4b and the voltage caused by the superposition 8 of the two power signal pulses 4a and 4b, respectively, which is visualized by a superposition pulse 8 in FIGS. 2a to 2c.

In general, the method ensures that the two pulses 4a and 4b are generated by cooperation of the control unit 6 and the two generators 3a and 3b. The first power signal pulse 4a is fed into the string of boxes $E_1$ to $E_{15}$ at the position of the first box $E_1$, and the second power signal pulse 4b is fed into the string of boxes at the position of the fifteenth box $E_{15}$. Following the supply of the two power signal pulses 4a and 4b into the string of boxes $E_1$ to $E_{15}$, the signal pulses 4a and 4b propagate towards each other through the structure of the delay elements and pass along the individual OLED comprised in each box $E_1$ to $E_{15}$.

In particular, FIG. 2a shows a first operation scenario, in which the temporal relationship between the two signal pulses 4a and 4b is set in such a way that they are generated at the same time, which is indicated by t=0 on the timeline t. Consequently, the delay time dt equals zero. Propagation of the power signal pulses 4a and 4b in opposite directions along the string of boxes $E_1$ to $E_{15}$ leads to a superposition of the power signal pulses 4a and 4b at the eighth box $E_8$ in the center of the string, which is shown in the form of the superposition pulse 8. This leads to OLED number eight (8) being driven in the forward direction and emitting light, because, at the position of overlap in the string, the sum of the voltage value of the two power signal pulses 4a and 4b adds up to a value beyond the value of the threshold voltage VF of the OLED number eight (8). This is indicated at t=t1 on the timeline t.

FIG. 2b shows a second operation scenario. At t=0, the first power signal pulse 4a is released into the string. In this scenario, the left (first) power signal pulse 4a is already propagating along the string of boxes $E_1$ to $E_{15}$ before the right (second) power signal pulse 4b is started. At t=t1, the second power signal pulse 4b is released into the string. The two propagating power signal pulses coincide at t=t2. According to this setup, a certain positive delay time dt was chosen, leading to a superposition at the tenth box $E_{10}$. This drives the tenth OLED into its light-emitting state.

FIG. 2c shows a third operation scenario. In contrast to the second operation scenario at t=0, the second power signal pulse 4b is released into the string at t=0. The first power signal pulse 4a is released into the string at t=t1 some time later in comparison with t=0. According to this setup, a certain negative delay time dt was chosen, leading to a superposition at the sixth box $E_6$. This drives the sixth OLED into its light-emitting state. In this scenario, the right (second) power signal pulse 4b was already propagating along the string of boxes $E_1$ to $E_{15}$ before the left (first) power signal pulse 4a was started.

In all of these three scenarios, the superposition of the two power signal pulses 4a and 4b leads to a total signal strength exceeding the forward voltage VF, which allows the current flow in the forward direction through the OLED to be exposed to the superposition of the two propagating power signal pulses 4a and 4b. In order to achieve an overlap of the power signal pulses 4a and 4b within the string of boxes $E_1$ to $E_{15}$, the following condition must be met:

$$|dt| \leq n \cdot t_{seg} \quad \text{(Equation 4)}$$

wherein n is in the range of 1 to 15 in the case of the present example of the embodiment. In order to perform a proper timing for addressing the desired OLED to be illuminated, the control unit 6 applies the following equation, which allows defining the number $n_{sel}$ of OLED to be exposed to the superposition of the two power signal pulses 4a and 4b and computing the required delay time dt as a function of $n_{sel}$ and $t_{seg}$:

$$t_{delay} = (2 \cdot n_{sel} - (n+1)) \cdot t_{seg} \quad \text{(Equation 5)}$$

wherein $n_{sel}$ is in the range of 1 to 15 in the case of the present example of the embodiment. Equation 5 takes account of the fact that there are n+1 elements in the delay structure comprising delay elements $5_1$ to $5_n$ and the last $(n+1)^{st}$ inductor L, but only n OLEDs $2a$ to $2n$. At this point, it is highlighted that symmetry considerations regarding the delay structure have been initially made.

For the sake of clarity, it is to be noted that a superposition of the power signal pulses 4a and 4b at the OLED $2_1$ to $2_n$ does not lead to a total dissipation of the two power signal pulses 4a and 4b. Because of the non-linear characteristic curve of the OLEDs $2_1$ to $2_n$, only a part of the energy or power supplied by the power signal pulses 4a and 4b is actually dissipated. This situation is similar to a valve requiring a certain opening strength so as to be opened and allowing a medium to pass the valve. The medium causing the opening of the valve does not entirely disappear from that side of the valve where the pressure was built up after the pressure diminishes when a certain part or quantity of the medium passes the open valve. Taking this analogy into account, a precautionary measure is recommended when operating the circuit 1. In order to avoid unwanted and uncontrolled further superpositioning of the residual parts of the power signal pulses 4a and 4b, which continue their propagation after overlapping each other at the position of an OLED or several OLEDs, the residual power signal pulses 4a and 4b necessitate dissipation at the impedances Z at the respective end of the delay structure. Hence a certain relaxation or recovery time is recommended before feeding new power signal pulses 4a and 4b into the delay structure.

The circuit 1 may be comprised in a display device for advertising or consumer electronic (CE) devices or the like. As an example, a multi-light chain for indicating a fast-forward or fast-rewind operation of an audio playback device may be considered. The CE device triggers the circuit 1 and provides data indicating the direction of browsing through e.g. an MP3 audio file. Based on this direction indicating data, the control unit 6 controls the timing of the generators 3a and 3b, such that in the case of fast-forward operation, a light spot traveling from left to right is visible and in the case of fast-rewind operation, a light spot traveling from right to left is visible.

Figure 3:
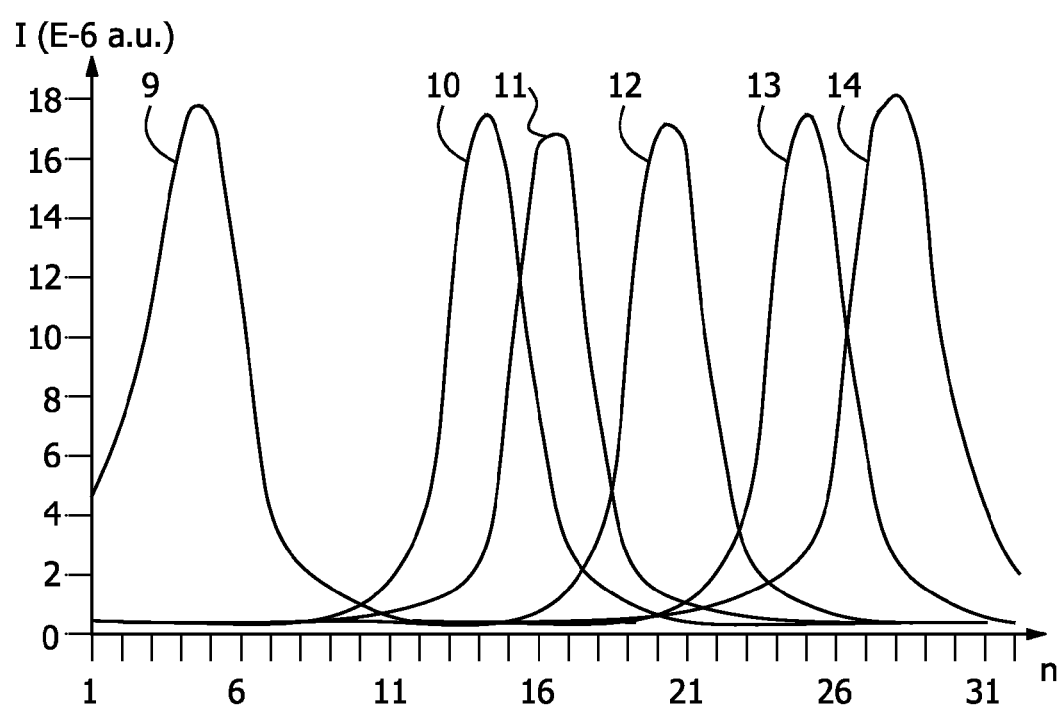
FIG. 3 shows a simulation result for a circuit as shown in FIG. 1.

FIG. 3 shows a simulation result of a simulation of the circuit 1, in which a total number of 32 OLEDs is installed. The x-axis shows the position of the OLEDs. The y-axis shows the integral of the OLED current in arbitrary units. In order to perform a simulation, LEDs are used in the simulation instead of the ideal OLED having only light-emitting properties (and no parasitic properties—e.g. capacitive and/or inductive properties—as realistic OLEDs would have), which substantially correspond to the properties of LEDs. The following values were selected for the elements of the electric circuit: L=10 µH, C=100 nF and the diode D for which the simulation model of the device termed "LXK2-PW14" from Philips Lumileds is used. This leads to the following parameters: Z=10 Ohm, $t_{seg}$=1 µs. The two power signal pulses 4a and 4b are rectangularly shaped and have a pulse duration of 20 μs and a signal strength of 5 Volts during the pulse and 0 Volt before and after the pulse. The rise and fall time of the power signal pulses 4a and 4b was selected to be 2 ns. The pulse length of 20 μs is quite long, resulting also in a long time in which the pulses are superpositioned to each other. The spatial extension of the zone of overlap of the power signal pulses 4a and 4b therefore extends beyond the location of only one single LED, hence covering multiple LEDs. Consequently, the resulting LED currents clearly indicate that there is not a selection of only one single LED but rather a number of neighboring LEDs emits light with a different intensity or brightness. However, the location of the peak of the LED current depends on the selected delay time dt. For the LED currents denoted by reference numerals 9 to 14, the selected delay times are shown in the following Table:

|  | Reference numeral | | | | | |
| --- | --- | --- | --- | --- | --- | --- |
|  | 9 | 10 | 11 | 12 | 13 | 14 |
| Delay time | −25 μs | −5 μs | 0 μs | 10 μs | 20 μs | 25 μs |

On the one hand, the number of LEDs triggered to emit light depends on the selected power signal pulse duration. Typically, due to the non-linear characteristics of the load elements, not all energy stored in the power signal pulses 4a and 4b is consumed completely in one single LED, hence some part of the power signal pulses 4a and 4b travels to the next LED. In general, shorter pulses will result in fewer LEDs emitting light. It is possible to activate only one single LED by optimizing the parameters described above, but, on the other hand, this optimization also depends on the voltage vs. current characteristic curve of the selected LED. Therefore, an analytical equation is not presented.

When producing a stable power signal pulse pattern at a sufficiently high repetition frequency, e.g. higher than 50 Hz, a stable light region extending over a single LED or extending over a plurality of LEDs can be generated. When the delay time is now varied in small steps, a smooth movement of the light region is obtained.

When producing a suitable sequence of power signal pulses at a sufficiently high repetition rate, it is also possible to activate more than one region in a consecutive fashion, e.g. one after the other. The impression a person watching the LEDs will have will be determined by physiological properties of the human eye or the processing of nerve stimuli produced by the human eye. Due to the slow response of the human eye, several bright spots seem to be present at the same time. As a result, a large number of lit regions may be shown virtually at the same time.

Figure 4A:
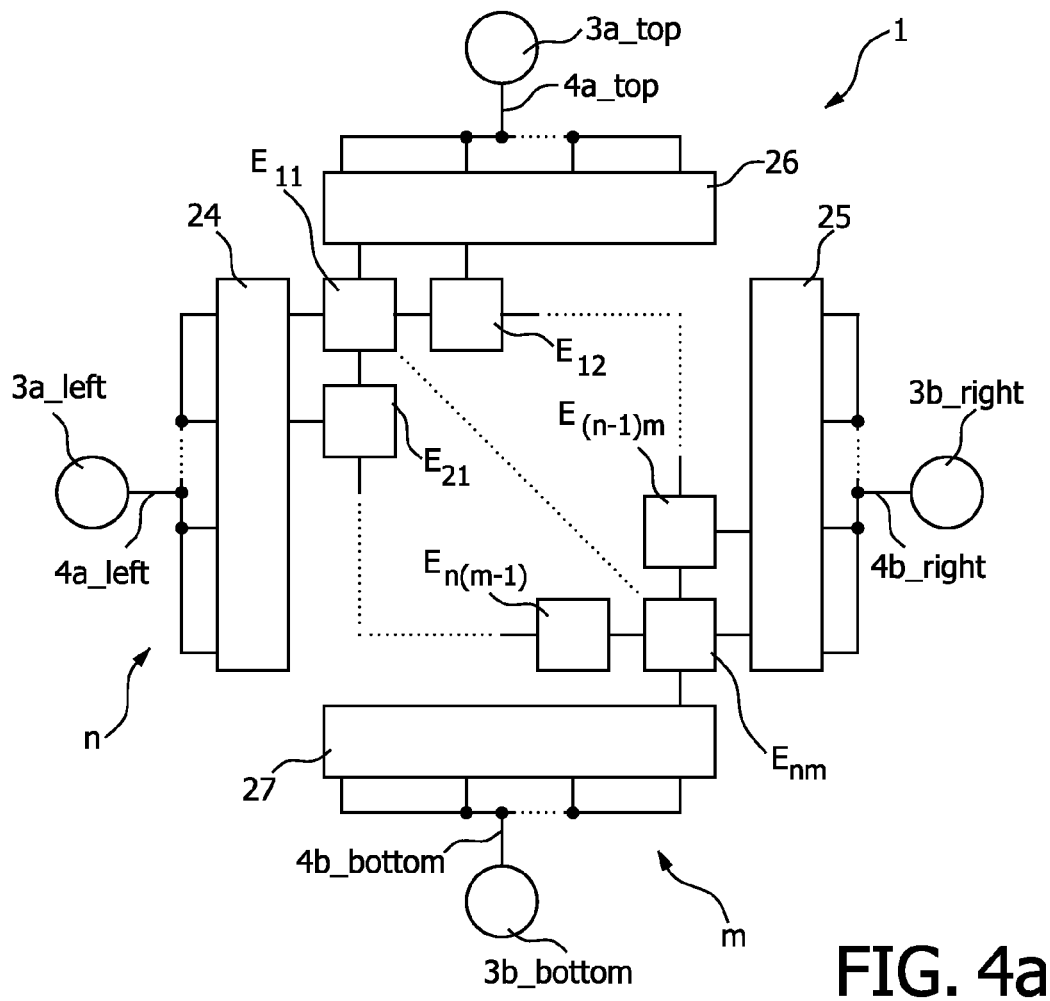
FIG. 4a shows an extension of the one-dimensional configuration in FIG. 1 to a two-dimensional configuration.
Figure 5:
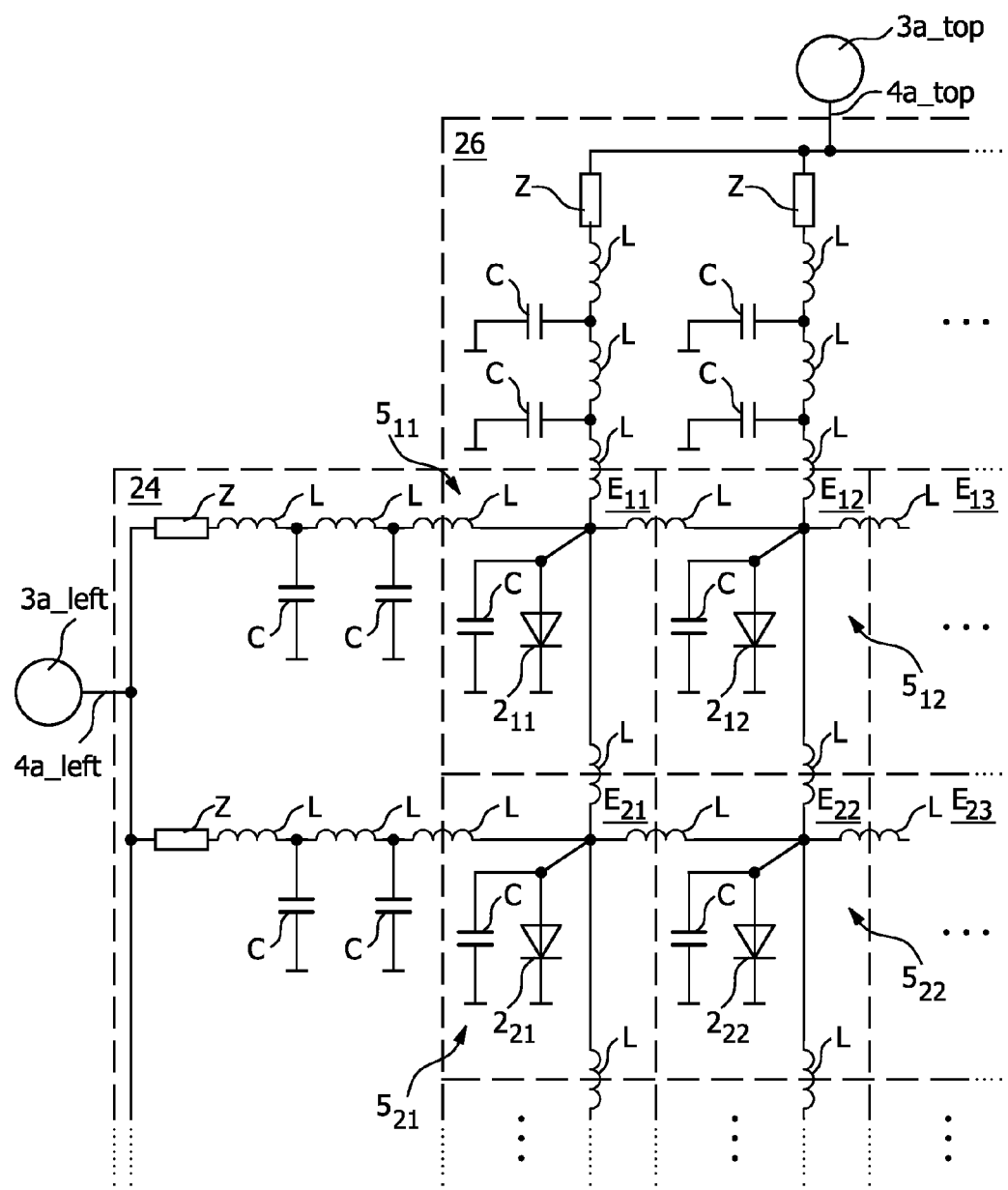

The one-dimensional structure of the delay line as described above is now extended into a two-dimensional structure to form a delay plane constituted by discrete elements, which is shown in FIG. 4a and FIG. 5. Again, the principle of operation is explained by assuming that ideal OLEDs having only light-emitting properties are used.

FIG. 4a shows the circuit 1 which comprises four pulse generators located at each side and labeled as 3a_left, 3b_right, 3a_top and 3b_bottom in order to indicate that the two-dimensional structure can also be understood to be a number of n horizontal propagation lines running in parallel from left to right and a number of m vertical propagation lines running in parallel from top to bottom in the plane of the drawing. Each generator 3a_left, 3b_right, 3a_top and 3b_bottom is connected via a corresponding coupling network 24, 25, 26 and 27 with the inner structure of the circuit 1 which shows n times m identical boxes denoted by reference signs $E_{11}$ to $E_{nm}$. The numbers following the symbol "E" hereinafter indicate the discrete coordinate position by means of the indexes "n" and "m".

Figure 4B:
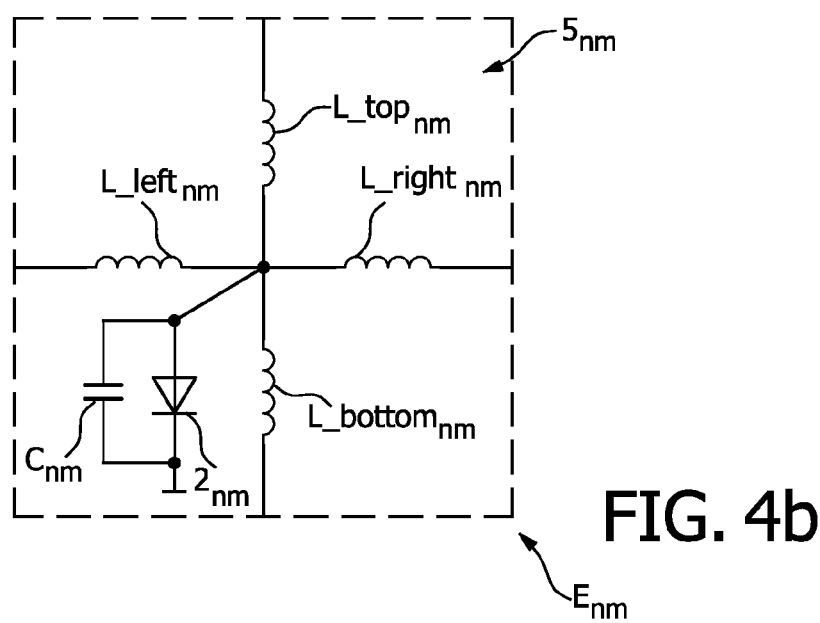

Each joint of one of the horizontal delay lines with one of the vertical delay lines has its center in one of the identical boxes $E_{11}$ to $E_{nm}$, of which box $E_{nm}$ located in the lower right part of the delay plane is shown in a detailed view in FIG. 4b. It comprises a capacitor $C_{nm}$, which is equivalent to the capacitor C shown in FIG. 1, and an OLED $2_{nm}$ which is equivalent to e.g. the diode $2_1$ shown in FIG. 1. In addition, four inductors L_left$_{nm}$, L_right$_{nm}$, L_top$_{nm}$ and L_bottom$_{nm}$ are shown. In fact, the combination of each of these inductors with corresponding inductors of neighboring boxes or with inductors of the neighboring coupling network realizes an inductor which is equivalent to the inductor L shown in FIG. 1. Splitting the inductor L into left, right and up, down parts only serves purposes of clarity, but only the combined inductor L would be present in a real-world implementation. This circumstance is visualized in FIG. 5, in which the uppermost left part of the circuit is shown in detail. The edges of the boxes $E_{11}$ to $E_{23}$ are drawn in a way to split the inductors L into two (identical) parts. Also details of a part of the coupling networks 24 and 26 are shown.

For the sake of clarity, it is to be noted that also the elements of the coupling networks are replicated in conformity with the number n or m, as the case may be. The coupling networks 24 to 27 are in fact extensions of the edge-located matrix elements $E_{11}$ to Enm, e.g. $E_{11}$, $E_{12}$, $E_{13}$, $E_{21}$ and so forth, comprising e.g. the components of the delay elements and some resistors, but should not have a light-emitting area of the OLED. The coupling networks are required to minimize side effects such as preventing short-circuit of the power signal pulses released e.g. from the vertical generators 3a_top and 3b_bottom via the common connections with the horizontal generators 3a_left and 3b_right, and vice versa. Given the fact that a power signal pulse is fed into the entire number of propagation lines extending parallel to each other, the inductive couplings at the points of intersection with orthogonal propagation lines does not affect the propagation of pulses in the first-mentioned dimension, and vice versa. This is basically given by the fact that the power signal pulses appear at the same time and at the same positions along the parallel extending propagation lines. It is the basic consideration for extending the one-dimensional structure into a two-dimensional structure.

In analogy with the embodiments described hereinbefore, also the two-dimensional embodiment allows creating light effects by means of timing the creation of individual power signal pulses, which in the present case are labeled 4a_left, 4b_right, 4a_top and 4b_bottom. Some simulations of a two-dimensional (11·11) matrix element embodiment of the circuit 1 are shown in FIGS. 6a to 6d in which areas of high brightness are labeled B, areas of low brightness are labeled D and areas of intermediate brightness are labeled M. However, the basic principle of operation is the same as in the one-dimensional case but with a two-dimensional visual effect. Applying, for example, only the power signal pulses 4a_left and 4b_right with an appropriate timing leads to a light spot extended in the vertical direction as visualized in FIG. 9d. Without any edge effects, it would be a complete vertical line. Applying only the power signal pulses 4a_top and 4b_bottom with the appropriate timing leads to a horizontally extended light spot. Applying more than two power signal pulses 4a_top, 4b_bottom, 4a_left and 4b_right, e.g. three or all four of them, with the appropriate timing and reduced amplitude in comparison with applying only two of them leads to activation of one point, as shown in FIGS. 9a and 9b. For FIGS. 9a and 9b, different timing parameters, i.e. different delay times were used. As a result, the highest brightness occurs at different positions. Generating the power signal pulses 4a_left and 4b_right with positive amplitude, which pulses propagate in the left-right direction without additional power signal pulses coinciding with those just generated, leads to a vertically illuminated line of OLEDs only. However, as soon as additional power signal pulses 4a_top and 4b_bottom with negative amplitude are generated and propagate in the top-down direction, a pause in said vertical line is produced and its position is determined in accordance with the timing applied. Other effects to be achieved may be the darkening or blanking out of a certain area or spot. The circuit 1 may also be used to realize an LCD backlighting device when applying a bias voltage and all four power signal pulses 4a_left, 4b_right, 4a_top and 4b_bottom. In the case of a constructive superposition, a local highlighting can be achieved. In the case of a destructive superposition, a local darkening can be achieved via the LCD backlighting device.

In all cases, providing one set of power signal pulses will lead to one light effect. Applying a series of power signal pulses, each with the same relative timing, will lead to a series of light effects at the same position, which may be preserved as a constant light effect (due to the slow response of the human eye) if the repetition rate of the series is fast enough.

Applying a series of power signal pulses and changing the relative timing during the series will lead to light effects at various positions. If the activated position is changed accordingly, the series of light effects at various positions may be perceived as a movement of the light effect. By means of this, a moving light effect indicating, for example, a suggested walking direction can be created for use as a guiding light.

After the above description of the principle of operation by means of equivalent circuit diagrams utilizing discrete inductors, capacitors and ideal OLEDs, the description of the invention will now depart from the domain of discrete structures and move into the domain of semi-continuum or continuum structures in which the above-described principle of operation of the invention is applied. Modification of a known OLED 28 shown in FIG. 7 performs this transformation into the continuum structure. Unlike LEDs, which have a discrete spot-like light-emitting structure, an OLED 28 realizes a surface-like light-emitting structure. Given the design of OLEDs, they are qualified to realize the continuum version of the n*m discrete version because they comprise nearly all of the components of the array of boxes $E_{11}$ to $E_{nm}$ as shown in FIG. 4a in its internal planar structure.

Based on the known structure of the prior-art OLED 28 and its intrinsic properties (continuum-like light emission and continuum-like capacitor), it is feasible to transform the discrete description of the circuit 1 (excluding the generators) into a finite element-based description of the planar continuum-like structure of an OLED 28. In addition to the already existing continuum-like capacitor, the feature to be added is the missing inductive behavior in order to realize a delay structure inside the OLED 28.

Figure 8:
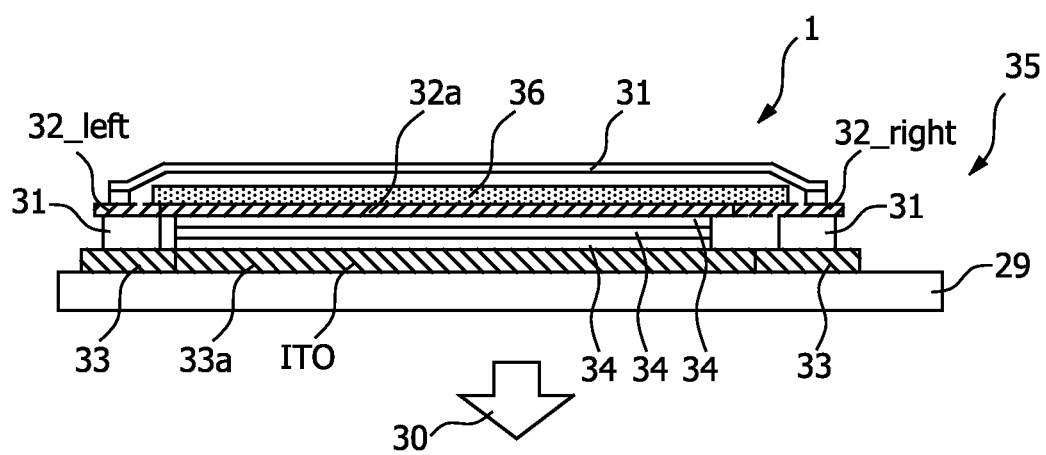
FIG. 8 shows a first embodiment of an OLED according to the invention.

In one embodiment, this is achieved by adding an inductive layer as shown for an OLED 35 according to the invention in FIG. 8. For the sake of clarity, it is to be noted that the generators for generating the power signal pulses are omitted in the following Figures in order to focus only on the structural improvements or modifications of the OLED 35. The generators for generating the power signal pulses as well as the coupling network mentioned in embodiments described hereinbefore may be comprised in the design of such an OLED 35 in order to create an integrated design. The generator and the coupling network may also be located separately from the OLED so to realize a hybrid design. These and other variations of design choices shall be comprised in the concept of this invention.

Figure 9:
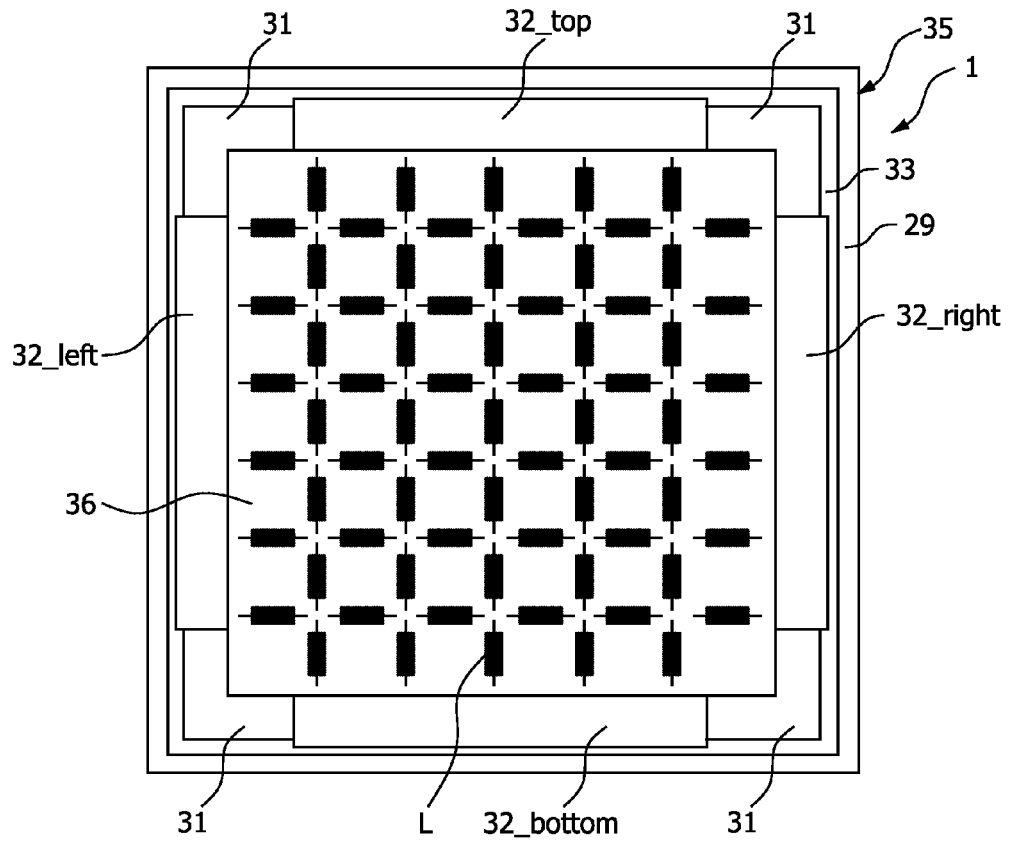
FIG. 9 shows a relevant structure of the OLED of FIG. 8.

As shown in FIG. 8, the OLED 35 according to the invention comprises a particular terminal structure. It shows the anode connector 33 and four (4) cathode connectors 32_left, 32_right, 32_top and 32_bottom on either side (see also top view of FIG. 9). The anode connector 33 extends seamlessly into the anode layer 33a with which it forms a rectangular structure. The cathode connectors 32_left, 32_right, 32_top and 32_bottom basically also extend seamlessly into the cathode layer 32a, but each cathode connector 32_left, 32_right, 32_top and 32_bottom shows a rectangular shape in itself which extends outwardly from the cathode layer 32a. In addition, a layer 36 having inductive properties, which in the present case is a ferromagnetic layer 36, covers the cathode layer 32a. In this embodiment, a common anode layer 33a is provided. However, four cathode connectors 32 (32_left, 32_right, 32_top, 32_bottom) are designed, each of which is located on one of the sides of the OLED 35 so that, in analogy with FIG. 4a, individual generators 3a_left, 3b_right, 3a_top and 3b_bottom can be connected. In other embodiments, either more than four (>4) or fewer than four (<4) cathode connectors 32_left, 32_right, 32_top and 32_bottom are possible. Also the location of said cathode connectors 32_left, 32_right, 32_top and 32_bottom may vary according to demand without departing from the scope of the invention. It is further possible not to use a common reference potential, but to structure this as well. FIG. 9 shows schematically the OLED 35 of which part of the cover 31 is removed. Hence, the view is directed into the open OLED 35. The direction of light emission is situated in the plane of the drawing. In the four corners, parts of the hermetic cover 31 are still visible. The ferromagnetic layer 36 is visible on top of the open OLED 35. Just for illustrative purposes, discrete inductors L are symbolically visualized in a rectangular structure on the surface of the ferromagnetic layer 36 in order to link the function of the ferromagnetic layer 36 with the inductors L in the explanation of the principle of operation of the invention, based on the one-dimensional and two-dimensional discrete elements. The ferromagnetic layer 36 is adjacent to the cathode layer 32a. The ferromagnetic layers 36 may be chosen from a material having certain optical properties, i.e. properties of reflecting the light, reflecting light only in a specific wavelength range, being transmissive to light, etc. The ferromagnetic layer 36—or more generally the structure for realizing an inductive property—may be e.g. glued on the stacked structure of the OLED 35 or pressed onto the OLED 35 by means of the cover 31. The cover 31 may also be made of a ferromagnetic material.

According to a further embodiment, omission of an additional ferromagnetic layer 36 but use of the electrode connectors 32, 32a and 33, 33a instead may also realize the inductive behavior, provided that the inductivity achieved by the electrode connectors 32, 32a and 33, 33a can be realized to show a sufficient value. Also the electrodes 32a and 33a alone or in combination with the electrode connectors 32 and 33 or in combination with the ferromagnetic layer 36 may realize the delay structure. According to further embodiments, the inductive behavior may be tuned according to demand by adding coils or using coils in combination with the ferromagnetic layer 36. Instead of designing any homogeneous ferromagnetic layer 36, it may be advantageous to design a structured layer. By structuring the ferromagnetic layer 36, eddy currents in this layer 36 can be reduced, and segmented OLEDs can be designed.

In another embodiment, a transparent ferromagnetic layer applied to the anode layer 33a may also realize the inductive function of the ferromagnetic layer 36 in the context of utilizing the anode layer 33a for realizing the inductive function of the OLED 35.

Figure 10:
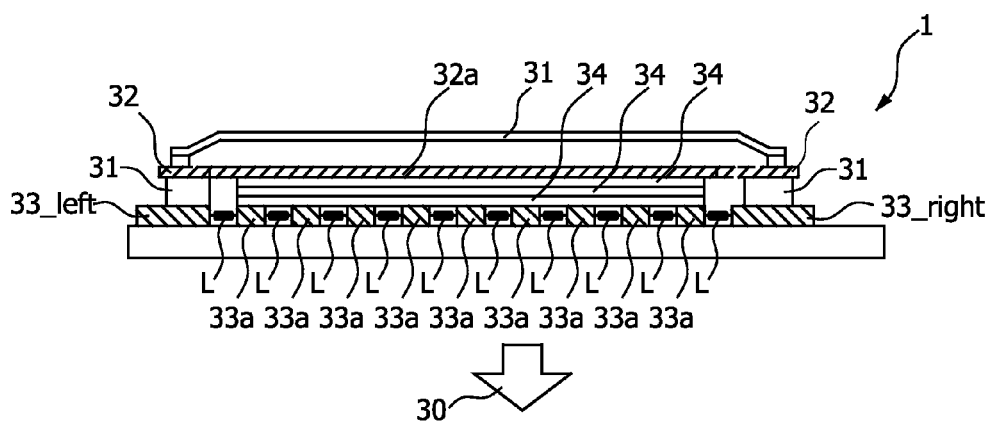
FIG. 10 shows a second embodiment of an OLED according to the invention.
Figure 11:
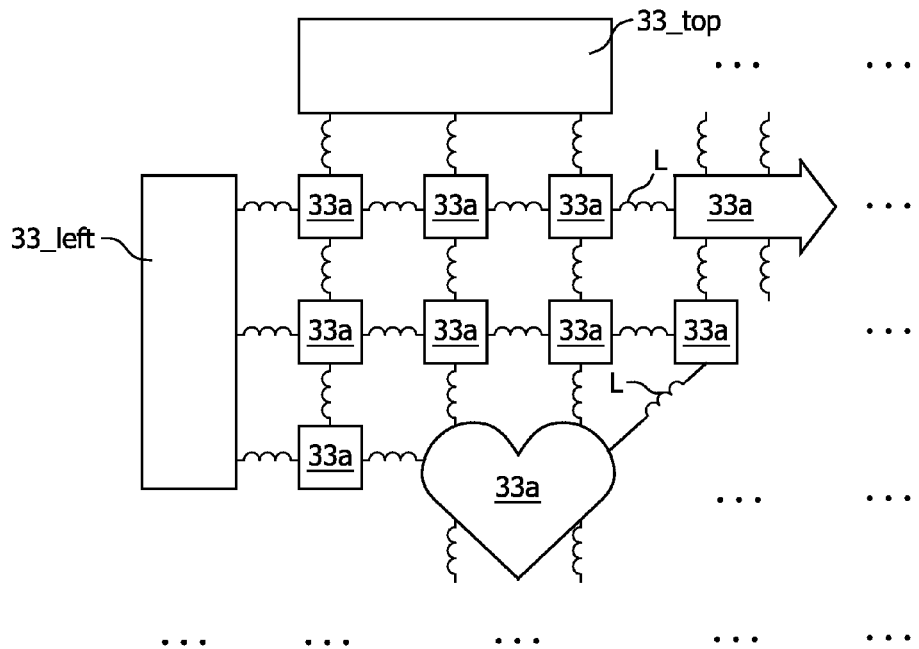
FIG. 11 shows an inductive structure created in a segmented anode layer of the OLED of FIG. 10.

FIG. 10 shows a further embodiment comprising a structured or segmented anode layer 33a, while the cathode layer 32a is designed as a plane-shaped unit with a common connector 32. For example, printed coils L may be used to realize the structured or segmented anode layer 33a. FIG. 11 is a schematic top view of an example of a part of such a structured anode layer 33a. It allows creating pixel segmentation but also free forms such as e.g. a heart or an arrow as visualized in FIG. 10. Other pre-defined symbols are also possible.

According to a further embodiment, it is also possible to establish the inductive function on the cathode layer 32a as well as on the anode layer 33a in one design. Therefore, printed coils with some ferromagnetic layer can be established on/in both layers 32a and 33a. By realizing such a design, a relatively high inductance value per unit of area (or length) can be achieved, such that power signal propagation is slowed down in comparison with lower inductive values.

The various embodiments of realizing the delay structure within the OLED 35 provide an inventive method of operating an OLED 35. It comprises the steps of receiving, with reference to a reference potential, at least two power signal pulses 4a_left, 4b_right, 4a_top, 4b_bottom, wherein the at least two power signal pulses 4a_left, 4b_right, 4a_top, 4b_bottom have a temporal relationship with one another and such a signal strength that a part of the light-emitting structure is powered or driven accordingly when the power signal pulses 4a_left, 4b_right, 4a_top, 4b_bottom coincide at said part of the light-emitting structure; feeding the at least two power signal pulses 4a_left, 4b_right, 4a_top, 4b_bottom into a delay structure of the OLED at different positions of the delay structure; delaying a propagation of the at least two power signal pulses 4a_left, 4b_right, 4a_top, 4b_bottom within a delay structure; and powering or driving said part of the light-emitting structure by coincidence of the at least two power signal pulses 4a_left, 4b_right, 4a_top, 4b_bottom at said part of the light-emitting structure.

The receiving step is herein performed by means of a plurality of cathode connectors 32 or anode connectors 33, as the case may be, wherein each connector 32 or 33 is assigned to the individual power signal pulses 4a_left, 4b_right, 4a_top, and 4b_bottom.

In the context of the method, the delaying step is performed with the aid of a capacitive element realized by means of the light-emitting structure (uniform or segmented) of the OLED 35.

Further to this, the delaying step is performed with the aid of an inductive element realized by way of a discrete or a continuum-like embodiment, as explained in detail above.

Figure 6A:
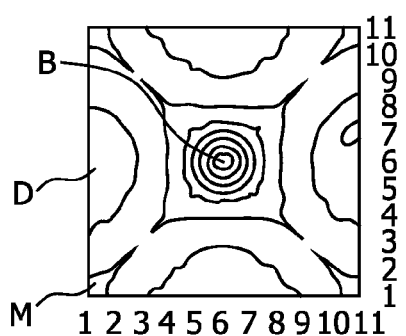
FIGS. 6a to 6d show some simulation results of the circuit of FIG. 5.
Figure 6A:
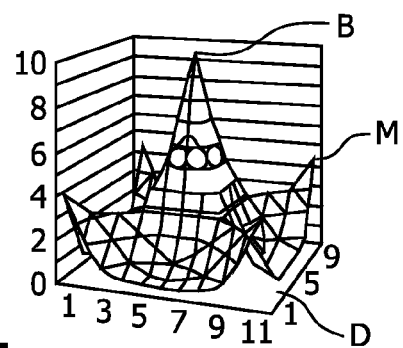
Figure 6B:
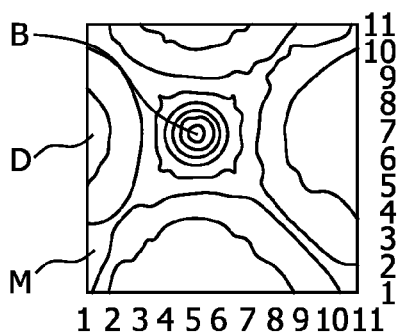
Figure 6B:
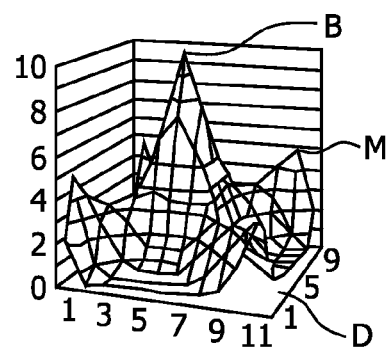
Figure 6C:
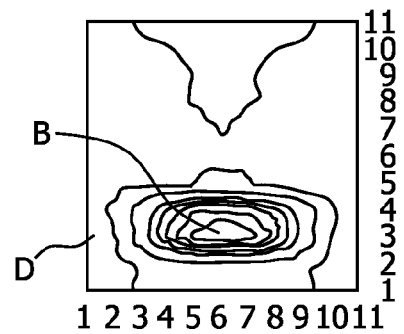
Figure 6C:
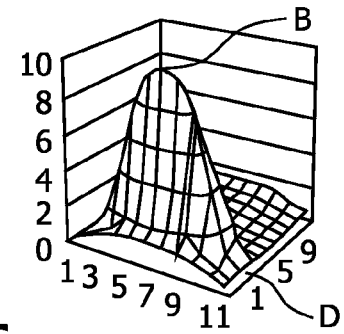
Figure 6D:
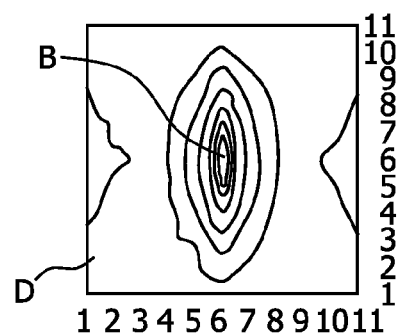
Figure 6D:
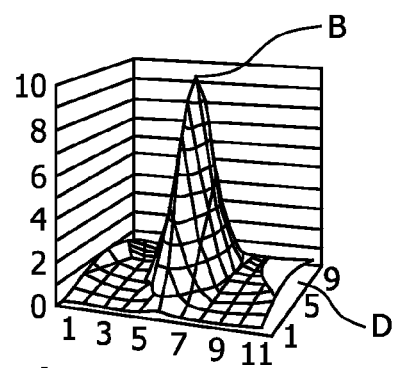

A simulation of the OLED according to the invention will finally lead to the similar results as already visualized in FIGS. 6a to 6d, wherein different resultant light intensity distributions depending on different power signal pulse amplitudes and delay settings are visualized. As initially explained, OLEDs show some current distribution errors leading to a degraded brightness in the center of the OLED. Therefore, an appropriate parameter setting can be chosen in order to compensate for this degradation. The concept of this compensation is given by the result shown in FIG. 6a. Combining during a defined period, e.g. having a duration of 90% of the time, a direct current DC signal with power signal pulse trains for the remaining 10% of the time can compensate for these current distribution errors. This in fact leads to a superposition of the DC signal-based degraded brightness distribution with the brightness distribution created by means of the timed power signal pulses, e.g. as shown in FIG. 6a.

Figure 12A:
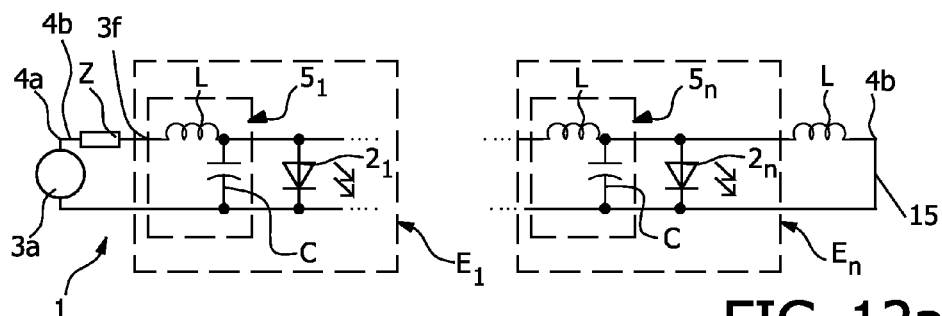
FIG. 12a is a schematic circuit explaining a modified principle of operation.
Figure 12B:
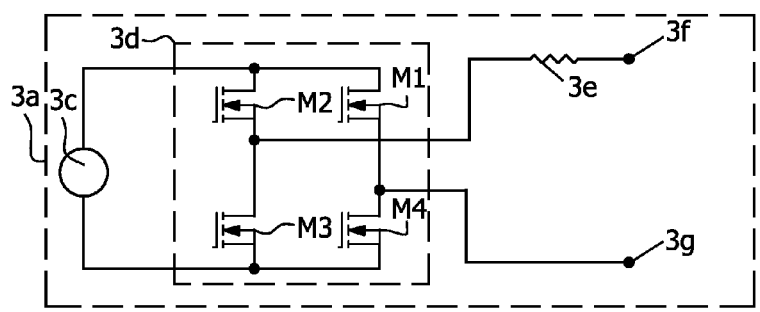

Although two signal generators are present in the embodiment described above, it is to be noted that only one signal generator may also be used to generate at least two power signal pulses 4a and 4b traveling along the string structure. According to this second embodiment, power signal pulses may be fed into the OLED e.g. at its left side and reflected by means of a short-circuited right side. Such a second embodiment and its operation will hereinafter be explained with reference to FIG. 12a showing a discrete circuit 1 for explaining the basic principle of operation only. In comparison with the embodiment of the discrete circuit 1 shown in FIG. 1, the second generator 3b is substituted by e.g. a wire 15 which short-circuits the extreme right end of the propagation line, which leads to an unmatched termination. This causes power signal pulses to be reflected with inverted polarity at this position. The first generator 3a shows a particular design taking this circumstance into account, as shown in FIG. 12b. The Figure shows a signal source 3c, a MOS-FET full bridge inverter structure 3d, which comprises four (4) NMOS transistors M1 to M4, and a source resistor 3e which, for providing matched conditions, is designed to have an impedance Z which has the same value as the impedance Z of the propagation line. This design allows generating power signal pulses 4a and 4b having a positive polarity as well as a negative polarity. Other design implementations may also provide a solution for generating bipolar power signal pulses.

The operation of the second embodiment will now be described. At t=0, the first power signal pulse 4a having a negative polarity is generated with a signal strength of −0.75 VF. In the case of a resistive source impedance, the open loop voltage of the ideal generator is set at 2·(−0.75·VF)=−1.5·VF. The first power signal pulse 4a thus generated propagates along the propagation line and the OLEDs are not powered because of the negative polarity. At t=t1, the first power signal pulse 4a reaches the end of the propagation line, where it is reflected. Because of the change in the traveling direction, the reflected first power signal pulse 4a is now labeled as the second power signal pulse 4b and propagates along the propagation line with a positive polarity and a signal strength of 0.75·VF in the direction back to the first pulse generator 3a. This is similar to the first embodiment, in which a second pulse generator 3b is provided for generating the second power signal pulse 4b. Given this signal strength of the second power signal pulse 4b, still none of the OLEDs is powered. Without any superposition with another power signal pulse, the second power signal pulse 4b would simply travel along the propagation line and be dissipated by the source resistance 3e. Now assuming that a further (fresh) first power signal pulse 4a is generated at t=t2 with a positive polarity having a signal strength of 0.75 VF, also this further first power signal pulse 4a does not power any of the OLEDs when travelling along the propagation line. At t=t3, the two power signal pulses 4a and 4b overlap constructively and result in the pulse 8 showing a signal strength of 1.5 VF if no OLEDs are present as described hereinbefore. Given the existence of OLEDs, the voltage V is truncated (not shown in FIG. 5a) at a certain level, and at least part of the signal energy is supplied to the OLED or OLEDs located at this position. In general, the position of the overlap is determined by the delay time dt between the two power signal pulses 4a and 4b. It is defined as the difference between the pulse starting time t2 of the (positive) further first power signal pulse 4a and the pulse starting time of the (negative) first power signal pulse 4a. Since the (negative) first power signal pulse 4a is generated at t=0, the delay time dt is equal to t2 (dt=t2). If, for example, an OLED near the extreme right end should be powered, the (positive) second power signal pulse 4b needs to be generated before the (negative) first power signal pulse 4a is reflected, hence the timing needs to be set at t2<t1. A general timing condition allowing the pulses to overlap constructively is given by the following equation:

$$0 \leq dt \leq n \cdot t_{seg} \qquad \text{(Equation 6)}$$

Otherwise, the two power signal pulses 4a and 4b will miss each other. In a real-world scenario, the theoretical model described herein needs to be adapted if the pulse duration is longer than $n \cdot t_{seg}$ because it is assumed in the present model that the pulse duration is shorter than $n \cdot t_{seg}$. In addition, according to the present model, powering the last ($n^{th}$) OLED leads to a delay time dt=0, hence no pulse at all would be generated. Also in a real-world scenario, addressing the last OLED could be difficult. However, applying a dummy segment or delay element, e.g. without any OLED, could solve this problem.

In analogy with the first embodiment, the required delay time dt can be calculated on the basis of the position of the luminosity peak at a particular OLED number $n_{sel}$:

$$t_{delay} = (n - n_{sel}) \cdot 2 \cdot t_{seg} \qquad \text{(Equation 7)}$$

Figure 13A:
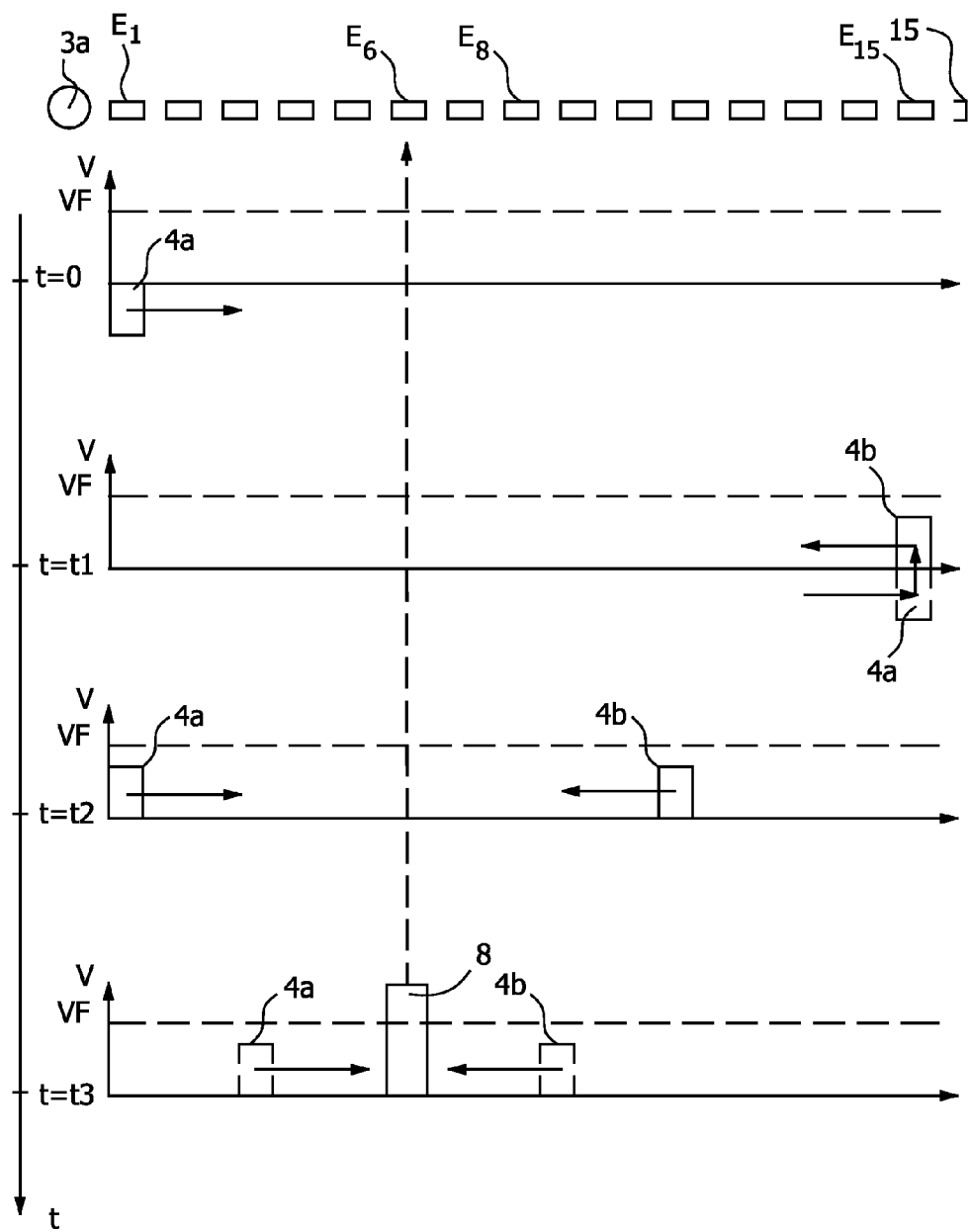

As mentioned in the context of the first embodiment, the pulse duration determines the number of active OLEDs and their brightness. FIG. 13a is a scheme of operation by means of traveling power signal pulses 4a and 4b that overlap and result in the pulse 8 at a particular element (in the present case at the box $E_6$) after the (negative) first power signal pulse 4a was reflected at the end of the propagation line. This scheme of operation reflects the timing as described above. The time line t extending from top to bottom is shown on the left side of the timing diagrams. At t=0, the first power signal pulse 4a is released. At t=t1, it is reflected with a positive polarity at the end of the propagation line now termed second power signal pulse 4b. At t=t2, the (positive) further first signal pulse 4a is released. At t=t3, the two pulses 4a and 4b overlap. The superposition takes place at the location of the box $E_6$. For the sake of clarity, the first generator 3a and the boxes $E_1$ to $E_{15}$ and the wire 15 realizing the end of the propagation line are shown at the top of FIG. 13a only in a very schematic manner and in reality are connected to each other as shown in detail in FIG. 12a.

Figure 13B:
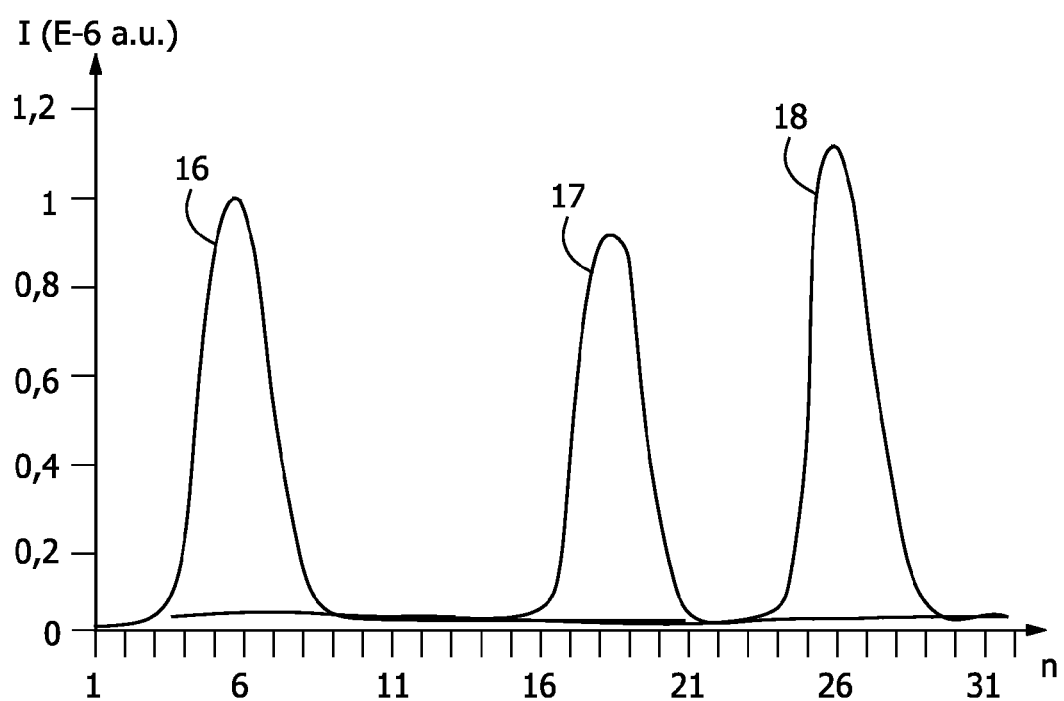

Similarly to FIG. 3, FIG. 13b shows simulation results for a circuit 1 as shown in FIGS. 12a and 12b. The parameters applied in this model are identical to the parameters applied in the model described with reference to the first embodiment. For the OLED currents denoted by reference numerals 16 to 18, the delay times $t_{delay}$ are shown in the following Table:

| Delay time | Reference numeral | | |
|---|---|---|---|
| | 16 | 17 | 18 |
| | 10 μs | 30 μs | 55 μs |

It is to be noted that the peak current for OLED current 17 should occur exactly at OLED position number eighteen (18). However, a slight deviation from the desired result is visible in the model result. Because of circumstances related to the modeling of the circuit 1, a correction of minus two (−2) μs of the delay time dt seems to be applicable in the present case.

Further to this, as already mentioned hereinbefore, some of the power signal pulse energy is dissipated and some of it still propagates along the propagation line. This further propagating energy may cause undesired powering or addressing of OLEDs if another power signal pulse is released at a too early instant. Given this non-ideal dissipation, it may happen that e.g. the further first power signal pulse 4a (or more precisely the non-dissipated part of it) continues propagating towards the end of the propagation line where it is reflected with a negative polarity and propagates towards the generator 3a. If a further negative pulse is now generated at a too early instant—e.g. before the reflected part of the further first power signal pulse 4a has reached the generator 3a and is dissipated in the source resistor 3e—this may lead to constructive overlapping of the two negative pulses. Due to the limited negative bias rating of the OLEDs used, this may cause difficulties. It is therefore proposed to start a new signal sequence only after a certain amount of time (a relaxation time) as defined by the following equation has expired. Thereafter, it is safe to start a new power signal pulse cycle:

$$t = t2 + 2n \cdot t_{seg} \qquad \text{(Equation 8)}$$

This design does not require any additional wires or cables for connecting the first end of the propagation line with the second end of the propagation line for the purpose of transmitting control signals or providing a mains connection or power supply connection for a second generator. Hence, this single generator powered design is perfectly suited for realizing long light sources, such as OLED tubes/bars showing e.g. a traveling light spot or light bar.

In a further embodiment, the generator 3a or the generators 3a and 3b may be designed to generate a negative bias voltage within the boundaries of the breakthrough voltage of the OLEDs applied in the circuit 1. This solution enables higher amplitudes of the power signal pulses to be generated and released into the propagation line in order to achieve a higher brightness for the selected OLED without accidentally powering additional (neighboring) OLEDs as described in the embodiments above.

In contrast to the embodiment making use of the negative bias voltage, also a positive bias voltage may be a design choice. In a preferred embodiment, the positive bias voltage may be selected to be just below the forward voltage of the OLEDs. This design enables the use of relatively low power signal pulse amplitudes to be generated by the generator(s) 3a (and 3b). It would improve the efficiency because only a power signal pulse 4a (and 4b) with a small amplitude would need to be released into the propagation line via the impedance-matching impedance. However, this design choice requires relatively low impedance inductivities L in order to allow proper operation.

Figure 14:
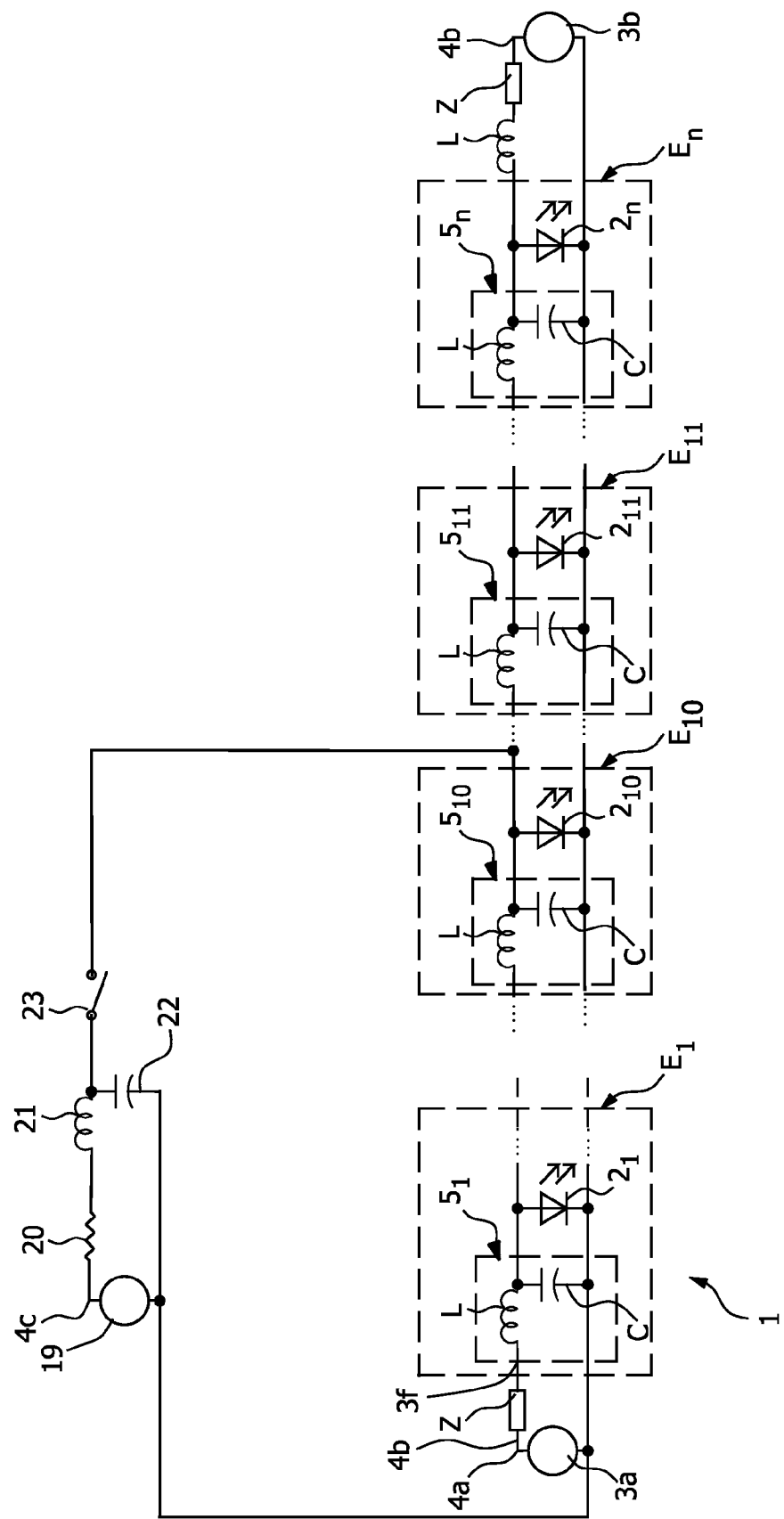
FIG. 14 is a schematic circuit explaining a further modified principle of operation.

In a further embodiment, power signal pulses are not only fed into the delay structure at the outermost edges of the OLED but may also be fed at particular positions within the structure of the OLED. This can be achieved by connecting a part of the electrode connectors e.g. by means of tiny (transparent) wires or conductors with an inner part of the delay structure. An additional interconnecting layer can also be provided for this purpose. Alternatively, a part (or area) of the electrode layer may be used to connect an inner part of the delay structure with the connector. The principle of operation of such an embodiment is explained with reference to FIG. 14 in the context of a one-dimensional delay structure. It explains the feeding of the power signal pulses not only from the outermost boundaries of e.g. the left and right end of a delay line, but also from positions within the delay line. Again, it is assumed that ideal OLEDs having only light-emitting properties are used. The concept shown in FIG. 14 comprises a third generator 19 in addition to the components already described with reference to FIG. 1. The generator 19 is designed to produce a third power signal pulse 4c. It is connected with an additional matching impedance 20 which is designed to have half the value of the characteristic impedance Z of the propagation line. Connected with the additional matching impedance 20 is a delay element-like structure which comprises an inductor 21, a capacitor 22 and a switch 23. The switch 23 is connected with the propagation line at the location of one of the OLEDs. In the present case, it is connected with OLED number ten (10). In order to cope with the particular power signal feeding situation, the value of the inductor 21 is designed to have half the value of the inductors L of the propagation line, and the value of the capacitor 22 is designed to be twice as high as the value of the capacitors C of the propagation line. The switch 23 is provided to either connect the elements 19 to 22 with, or to disconnect them completely from the propagation line. The design allows introducing additional power signal pulses 4c between the tenth ($10^{th}$) box $E_{10}$ and the eleventh ($11^{th}$) box $E_{11}$ of the delay line so that the introduced additional power signal pulses 4c can propagate in both directions along the propagation line. In a real-world application, which may comprise e.g. 30 blocks $E_1$ to $E_{30}$, there may be a further group of elements 19 to 23 which is connected between the nineteenth ($19^{th}$) box $E_{19}$ and the twentieth ($20^{th}$) box $E_{20}$. This allows defining three sections of the delay line, e.g. $E_1$ to $E_{10}$, $E_{11}$ to $E_{19}$ and $E_{20}$ to $E_{30}$. Depending on which OLED needs to be powered, the two additional power generators 19 can be used to support this as it fits best. If e.g. OLED number five (5) needs to be powered, it will be advantageous to use the first generator 3a in combination with the additional third generator 19 connected at OLED number ten (10). This may lead to a better result because otherwise the second power signal pulse 4b released from the second generator 3b would need to travel a relatively long distance before reaching the OLED number five (5) and would thus run the risk of degradation because of non-ideal component characteristics of the propagation line. In general, it may be advantageous to use those generators or combination of generators 3a, 3b or 19 that are connected closest to the selected OLED to be powered. Although two additional generators 19 are mentioned in the embodiments described above, it is to be noted that any other number can be applied as well. In addition, various feeding points for feeding the additional power signal pulses 4c generated by the additional generator or generators 19 can be selected according to demand. For example, a third generator with matching circuitry may be connected to several switches 23 which couple the power signal pulse into several feeding ports. However, also generator 3a or 3b may be used together with additional switches and, if necessary, additional matching circuitry instead of the third power signal generator 19. The principle of feeding power signal pulses to a particular position inside the delay line, as described above, can also be used with multi-dimensional structures, e.g. the delay plane inside the OLED. Again, suitable values for the matching impedances 2 have to be selected.

Without being conclusive, the OLED according to the invention is typically used in the field of general illumination or more particularly in the field of local highlighting in signal lighting applications or backlighting for vehicles, general topics of creating decorative effects, as well as in the domain of guiding lights. Depending on the granularity (resolution), which can be realized either by means of timing the power signal pulses or by segmentation, even display-like applications can be realized with the OLED according to the invention.

The invention has been illustrated and described in detail in the drawings and the foregoing description by way of non-limiting example and is not limited to the disclosed embodiments.

For example, it is possible to operate the invention in an embodiment in which the concept of the invention is utilized in consumer electronic devices or other display devices. The control unit 6 may cooperate with a central processing unit of the respective device for receiving control signals or commands to be interpreted by the control unit 6. The control unit 6 may control the position of the light-emitting area within the light-emitting structure of an OLED to be illuminated in accordance with the description above, but it may additionally control the frequency as well as the intensity of the illumination. Varying the rate of selecting individual areas of the OLED but also varying the form or shape or duration of the individual power signal pulses 4a and 4b may serve this purpose as well. In some embodiments, even completely transparent OLED structures may be used, which give the impression that a glass window emits light when the OLED is switched on.

It is to be understood that examples of operation presented in the initial explanation of the principle of operation and not being explicitly mentioned in connection with the OLED 35 according to the invention shall be considered as being disclosed also in the context of the OLED 35. In addition, individual designs applied to one of the sides of the OLED 35 (the respective electrode) may also be applied to the other side, as the case may be. Although the use of different materials for the electrode connectors and the electrodes is not explicitly disclosed for realizing the delay structure, it may be considered to be within the scope of the present invention. The direction of emitting light may also be a design choice which does not deviate from the disclosed concept of the OLED according to the invention.

Other variants of the disclosed embodiments can be understood and effected by those skilled in the art in practicing the claimed invention, from a study of the drawings, the disclosure, and the appended claims. In the claims, use of the verb "comprise" and its conjugations does not exclude elements or steps other than those stated in the claims, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims shall not be construed as limiting the scope.

The invention claimed is:

1. An organic light-emitting diode comprising
    a light-emitting structure configured to emit light in response to power signal pukes, and
    a delay structure configured to delay a propagation of at least two power signal pulses having a temporal relationship with one another and such a signal strength that a part of the light-emitting structure is driven in dependence on coincidence of the power signal pulses at said part of the light-emitting structure, wherein the delay structure comprises electrode connectors or electrode layers of the organic light-emitting diode, and
    a terminal structure configured to receive the at least two power signal pulses and to feed the delay structure at its different positions with the at least two power signal pulses.

2. An organic light-emitting diode according to claim 1, wherein the delay structure comprises a layer having inductive properties and extending adjacent to the light-emitting structure.

3. An organic light-emitting diode according to claim 2, wherein the layer extends adjacent to an electrode layer and/or at least partly overlaps at least one electrode connector of said electrode layer.

4. An organic light-emitting diode according to claim 2, wherein the layer extending adjacent to an electrode layer is transparent.

5. An organic light-emitting diode according to claim 1, wherein the delay structure comprises an inductive element and a capacitive element, both jointly forming a delay plane for delaying the propagation of the power signal pulses in both dimensions of the delay plane.

6. An organic light-emitting diode according to claim 1, wherein the delay structure comprises at least one of the electrode layers of the organic light-emitting diode and is structured in electrode layer segments and inductive elements, wherein neighboring electrode layer segments are connected with each other by means of said inductive elements.

7. An organic light-emitting diode according to claim 6, wherein the electrode layer segments form pixel segments and/or pre-defined free-form segments.

8. An organic light-emitting diode according to claim 1, wherein the delay structure comprises a capacitive element realized by means of the light-emitting structure of the organic light-emitting diode.

9. An organic light-emitting diode according to claim 1, wherein the light-emitting structure comprises a stack of layers jointly having a non-linear voltage-versus-current characteristic curve.

10. An organic light-emitting diode according to claim 1, wherein the light-emitting structure is split into segments.

11. A circuit for selectively powering a part of a light-emitting structure of an organic light-emitting diode configured to emit light in response to power signal pulses, said light-emitting diode comprising a terminal structure designed to receive the at least two power signal pulses and to feed a delay structure of the organic light-emitting diode at different positions of the delay structure with the at least two power signal pulses, wherein the delay structure is designed to delay a propagation of the at least two power signal pulses, said circuit comprising
a connector structure designed to cooperate with the terminal structure of the organic light-emitting diode and to transfer the at least two power signal pulses from the circuit to the organic light-emitting diode, and a generator arrangement connected with the connector structure, wherein the generator arrangement is designed to generate the at least two power signal pulses in such a way that the at least two power signal pulses have a temporal relationship with one another and such a signal strength that said part of the light-emitting structure is driven in dependence on coincidence of the power signal pulses at said part of the light-emitting structure.

12. A circuit according to claim 11, comprising an organic light-emitting diode, whose terminal structure is connected to the contact structure of the circuit.

13. A method of operating an organic light-emitting diode comprising a light-emitting structure configured to emit light in response to power signal pulses, the method comprising the steps of:
receiving at least two power signal pulses, wherein the at least two power signal pulses have a temporal relationship with one another and such a signal strength that a part of the light-emitting structure is driven in dependence on coincidence of the power signal pulses at said part of the light-emitting structure;
feeding a delay structure of the organic light-emitting diode at different positions of the delay structure with the at least two power signal pulses;
delaying a propagation of the at least two power signal pukes by means of the delay structure; and
driving said part of the light-emitting structure in dependence on coincidence of the power signal pulses at said part of the light-emitting structure.

14. The organic light-emitting diode according to claim 1, wherein the light-emitting structure comprises a stack of organic layers.

15. The organic light-emitting diode according to claim 14, wherein the stack of organic layers is configured to emit light in response to the power signal pukes.

16. The method of claim 13, wherein the delay structure comprises a layer having inductive properties and extending adjacent to the light-emitting structure.

17. The method of claim 16, wherein the layer extends adjacent to an electrode layer or at least partly overlaps at least one electrode connector of said electrode layer.

18. The method of claim 13, wherein the light-emitting structure comprises a stack of organic layers configured to emit light in response to the power signal pulses.

* * * * *